(12) United States Patent
Park et al.

(10) Patent No.: US 11,255,574 B2
(45) Date of Patent: Feb. 22, 2022

(54) OIL BOILER

(71) Applicant: KYUNGDONG NAVIEN CO., LTD., Gyeonggi-do (KR)

(72) Inventors: Jun Kyu Park, Seoul (KR); Dae Hyun Kim, Seoul (KR)

(73) Assignee: KYUNGDONG NAVIEN CO., LTD., Gyeonggi-do (KR)

( * ) Notice: Subject to any disclaimer, the term of this patent is extended or adjusted under 35 U.S.C. 154(b) by 0 days.

(21) Appl. No.: 16/863,263

(22) Filed: Apr. 30, 2020

(65) Prior Publication Data
US 2020/0348047 A1 Nov. 5, 2020

(30) Foreign Application Priority Data

May 3, 2019 (KR) .................. 10-2019-0052519

(51) Int. Cl.
| | |
|---|---|
| *F24H 1/18* | (2006.01) |
| *F24H 9/00* | (2022.01) |
| *F24H 9/16* | (2022.01) |
| *F24H 9/1836* | (2022.01) |
| *F24H 9/20* | (2022.01) |
| *F16D 3/04* | (2006.01) |

(52) U.S. Cl.
CPC ........... *F24H 9/0026* (2013.01); *F24H 1/186* (2013.01); *F24H 9/16* (2013.01); *F24H 9/1836* (2013.01); *F24H 9/2035* (2013.01); *F16D 3/04* (2013.01); *F24H 1/181* (2013.01)

(58) Field of Classification Search
CPC .... F24H 9/1836; F24H 9/2035; F24H 9/0026; F24H 9/0031; F22B 37/10; F22B 23/06; F22B 23/02; F23L 15/00
See application file for complete search history.

(56) References Cited

U.S. PATENT DOCUMENTS

| | | | |
|---|---|---|---|
| 2,000,733 A | * | 5/1935 | Avery .................... F23D 11/00 122/149 |
| 2,300,244 A | * | 10/1942 | Achterman .............. C10G 9/04 48/107 |

(Continued)

FOREIGN PATENT DOCUMENTS

| | | |
|---|---|---|
| CA | 3047961 A1 | 7/2018 |
| EP | 3232135 A1 | 10/2017 |

(Continued)

*Primary Examiner* — Gregory A Wilson
(74) *Attorney, Agent, or Firm* — Johnson & Martin, P.A.; James David Johnson

(57) ABSTRACT

An oil boiler includes an outer container having openings at opposite ends, a combustion chamber that covers an opening at an upper end of the outer container and in which a combustion reaction occurs, a lower cover that covers an opening at a lower end of the outer container, a plurality of flue tubes to heat heating water flowing in the outer container by guiding combustion gas, a burner including a fuel nozzle that sprays fuel, an air nozzle that injects air, and a spark plug that ignites a mixture of the fuel and the air, and a flame tube part that defines a tube space by surrounding a partial space in which the mixture is ignited, the flame tube part including a flame tube having an open lower end and a recirculation hole formed through the flame tube such that the combustion gas is introduced into the flame tube.

15 Claims, 20 Drawing Sheets

(56) References Cited

U.S. PATENT DOCUMENTS

| | | | | |
|---|---|---|---|---|
| 4,271,789 A | * | 6/1981 | Black | F24H 1/287 122/14.22 |
| 5,881,681 A | * | 3/1999 | Stuart | F24H 1/287 122/18.31 |
| 6,044,803 A | * | 4/2000 | Hamos | F24H 1/36 122/18.4 |
| 7,281,497 B2 | | 10/2007 | Le Mer et al. | |
| 8,783,334 B2 | * | 7/2014 | Lovato | F28D 7/1684 165/146 |
| 8,844,472 B2 | * | 9/2014 | Smelcer | F28F 1/06 122/18.3 |
| 9,097,436 B1 | * | 8/2015 | Smelcer | F23L 9/00 |
| 9,175,853 B2 | * | 11/2015 | Fioriti | F24H 1/26 |
| 10,012,413 B2 | * | 7/2018 | Li | F24H 8/00 |
| 2006/0196450 A1 | | 9/2006 | Le Mer et al. | |
| 2007/0144453 A1 | | 6/2007 | Garrabrant et al. | |
| 2012/0080172 A1 | * | 4/2012 | Pacholski | F24H 9/0015 165/157 |
| 2012/0292000 A1 | * | 11/2012 | Khan | F28D 1/0475 165/109.1 |
| 2020/0064024 A1 | | 2/2020 | Park et al. | |
| 2020/0318855 A1 | * | 10/2020 | Choi | F28F 1/40 |

FOREIGN PATENT DOCUMENTS

| | | | | |
|---|---|---|---|---|
| EP | 3287696 A1 | | 2/2018 | |
| GB | 737316 A | * | 9/1955 | F24H 9/1836 |
| JP | S58-127007 A | | 7/1983 | |
| JP | 2007-046794 A | | 2/2007 | |
| JP | 2008-261545 A | | 10/2008 | |
| KR | 10-1991-0000227 A | | 1/1991 | |
| KR | 10-1998-0701212 A | | 5/1998 | |
| KR | 10-2017-0113501 A | | 10/2017 | |
| KR | 10-2018-0058246 A | | 6/2018 | |
| WO | 2009078577 A1 | | 6/2009 | |

* cited by examiner

OIL BOILER

CROSS-REFERENCE TO RELATED APPLICATION

This application claims the benefit of priority to Korean Patent Application No. 10-2019-0052519, filed in the Korean Intellectual Property Office on May 3, 2019, the entire contents of which are incorporated herein by reference.

TECHNICAL FIELD

The present disclosure relates to an oil boiler.

BACKGROUND

A boiler is an apparatus for heating a desired area by heating fluid in a container. Accordingly, to heat heating water in the boiler, the boiler generally has a structure to generate a flame and combustion gas by causing a combustion reaction using a burner and heat the heating water using heat transferred from the flame and heat transferred from the combustion gas.

The burner requires fuel so as to cause the combustion reaction. Liquefied petroleum gas or liquefied natural gas, which is a kind of fossil fuel, may be used as the fuel. However, diesel fuel or kerosene of an oil type may also be used as the fuel.

In a case where the burner causes a combustion reaction using fuel of an oil type, it is difficult to cause the combustion reaction by controlling the amount of the fuel in the same way as when gas is used. Furthermore, when liquid fuel is used, a yellow flame is more likely to be formed by soot generated due to incomplete combustion. When the soot is generated, passages in the boiler through which combustion gas flows along a predetermined path may be blocked. In the case where the combustion gas does not smoothly flow, the boiler may not normally operate.

SUMMARY

The present disclosure has been made to solve the above-mentioned problems occurring in the prior art while advantages achieved by the prior art are maintained intact.

An aspect of the present disclosure provides a blue flame type oil boiler for generating a blue flame.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an oil boiler includes an outer container having openings at opposite ends thereof and an empty space therein, the empty space being connected to the openings at the opposite ends, a combustion chamber that covers an opening at an upper end of the outer container, the combustion chamber being located in the empty space of the outer container and having an interior space in which a combustion reaction occurs, a lower cover that is spaced apart downward from the combustion chamber and that covers an opening at a lower end of the outer container, a plurality of flue tubes provided in the empty space of the outer container to heat heating water flowing in the empty space of the outer container by guiding combustion gas generated by the combustion reaction from the interior space of the combustion chamber to the outside of the lower cover, a burner including a fuel nozzle that sprays fuel of an oil type into the interior space of the combustion chamber, an air nozzle that injects air into the interior space, and a spark plug that ignites a mixture of the fuel sprayed and the air injected, and a flame tube part that defines a tube space by surrounding, in the interior space, a partial space in which the mixture of the sprayed fuel and the injected air is ignited, the flame tube part including a flame tube having an open lower end and a recirculation hole formed through the flame tube such that the combustion gas in the interior space is introduced into the flame tube from the outside of the flame tube.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
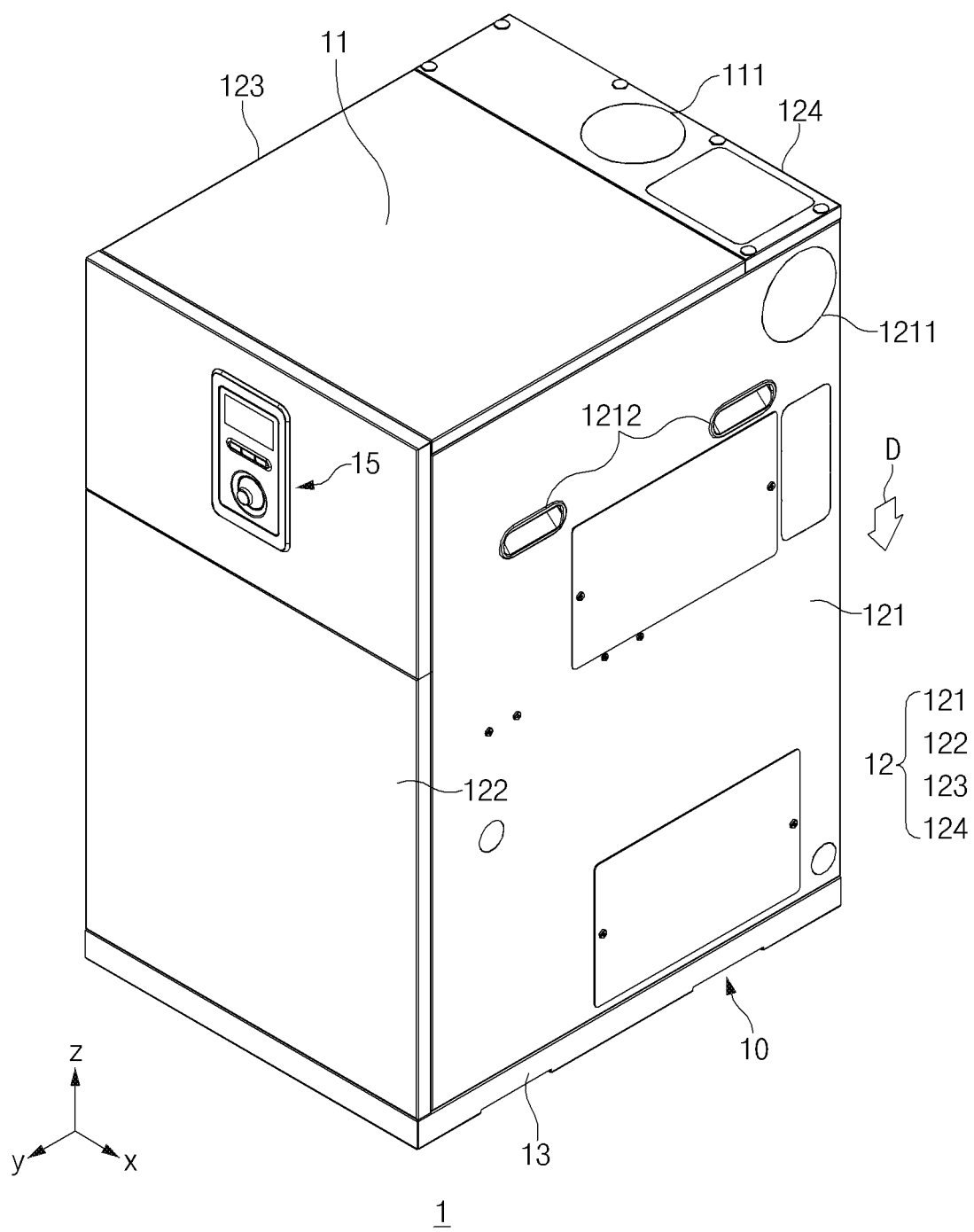
FIG. 1 is a perspective view of an oil boiler according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, this may mean the components are not only directly "connected", "coupled", or "linked" but also are indirectly "connected", "coupled", or "linked" via a third component.

Figure 2:
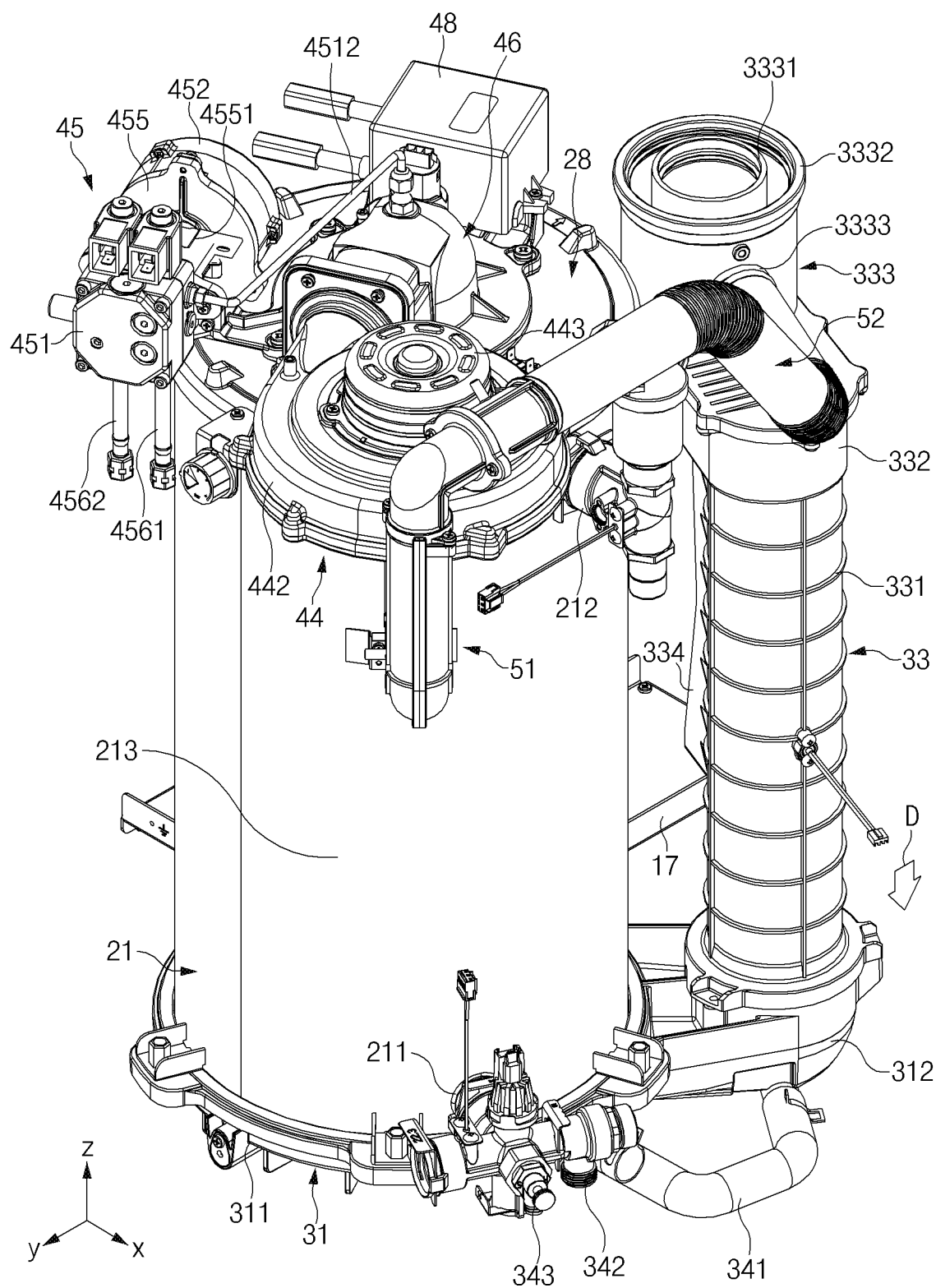
FIG. 2 is a view illustrating a situation in which a case of the oil boiler is removed according to an embodiment of the present disclosure.
Figure 3:
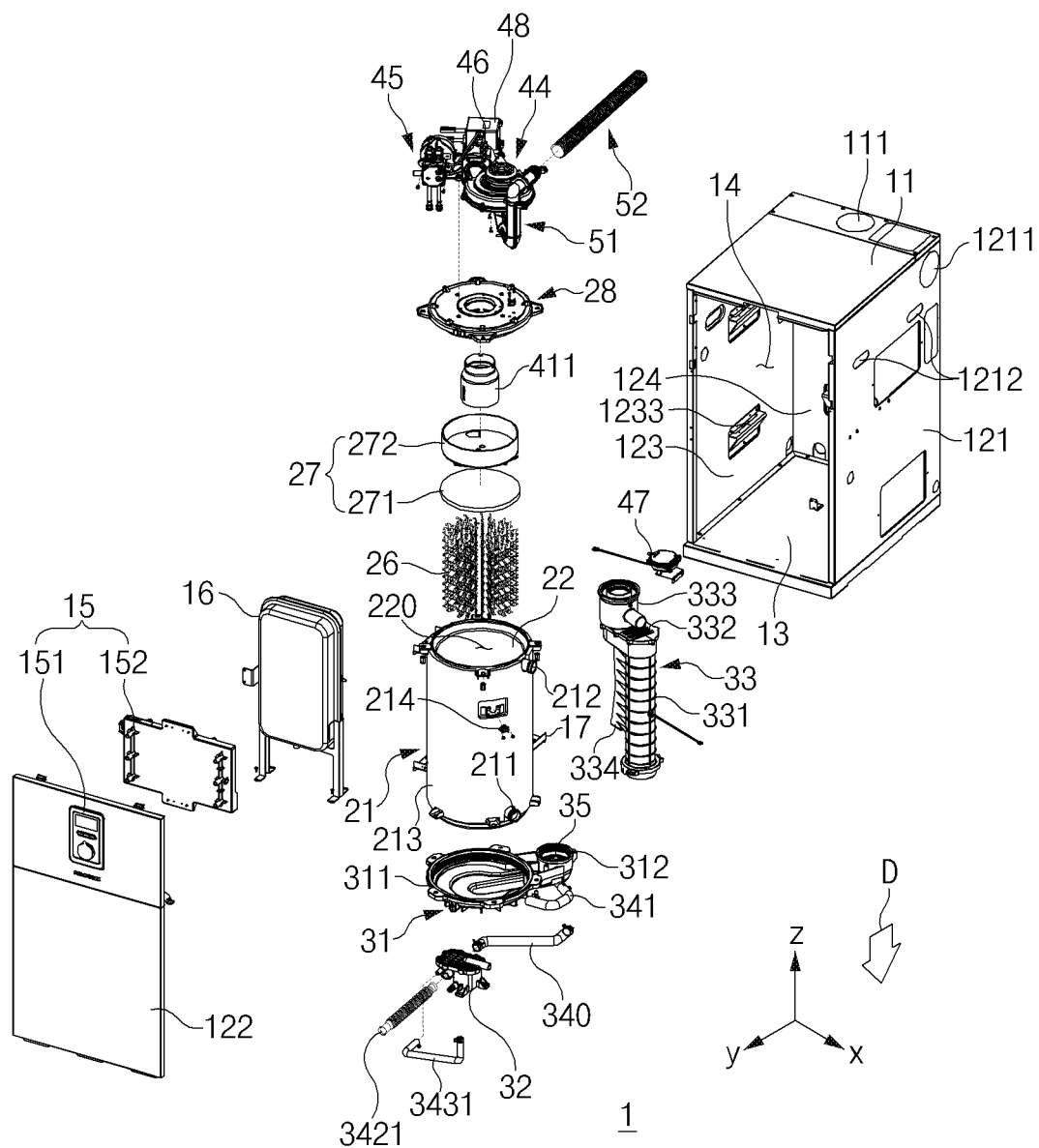
FIG. 3 is an exploded perspective view of the oil boiler according to an embodiment of the present disclosure.
Figure 4:
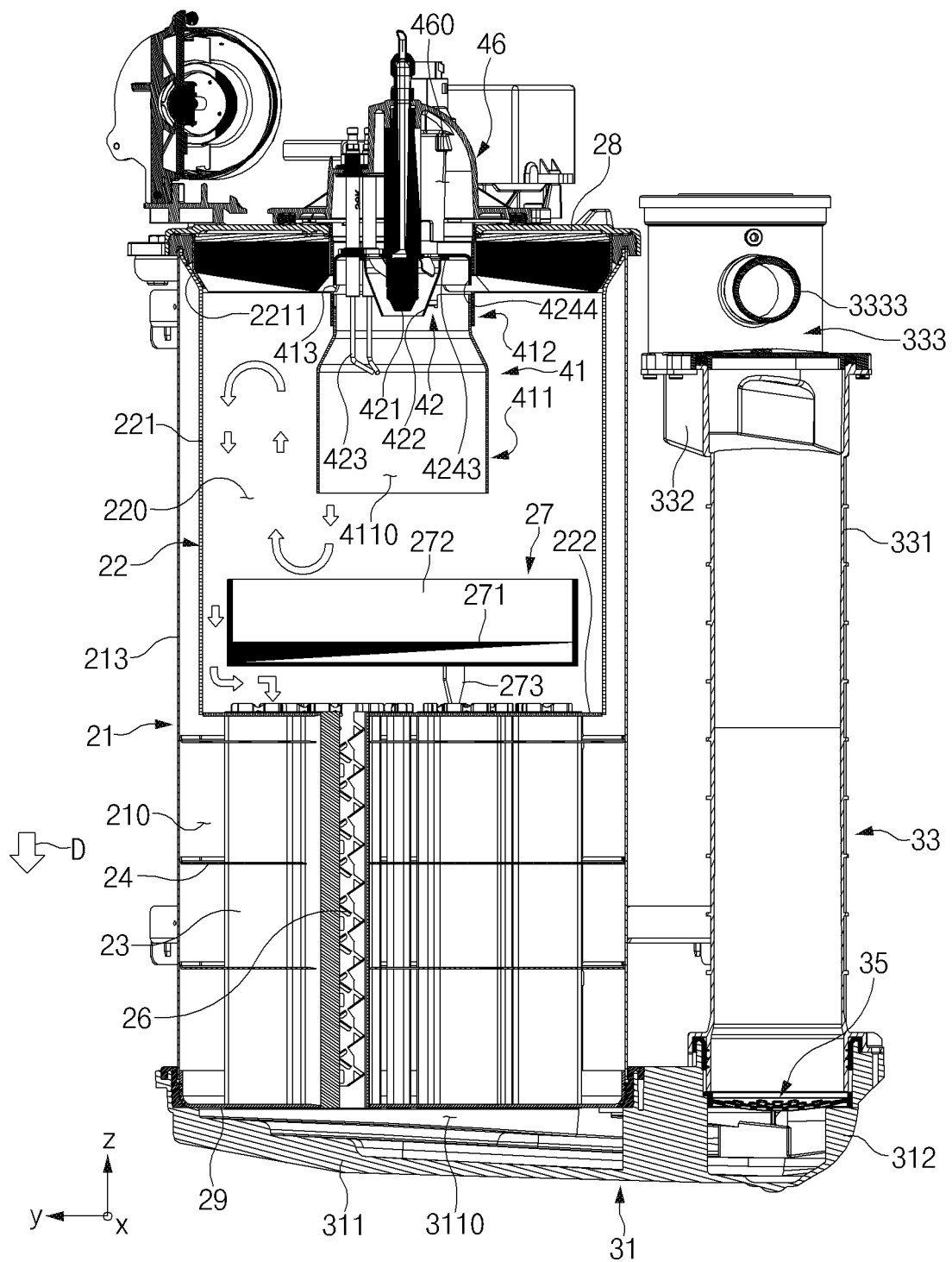
FIG. 4 is a vertical sectional view of the oil boiler according to an embodiment of the present disclosure.
Figure 5:
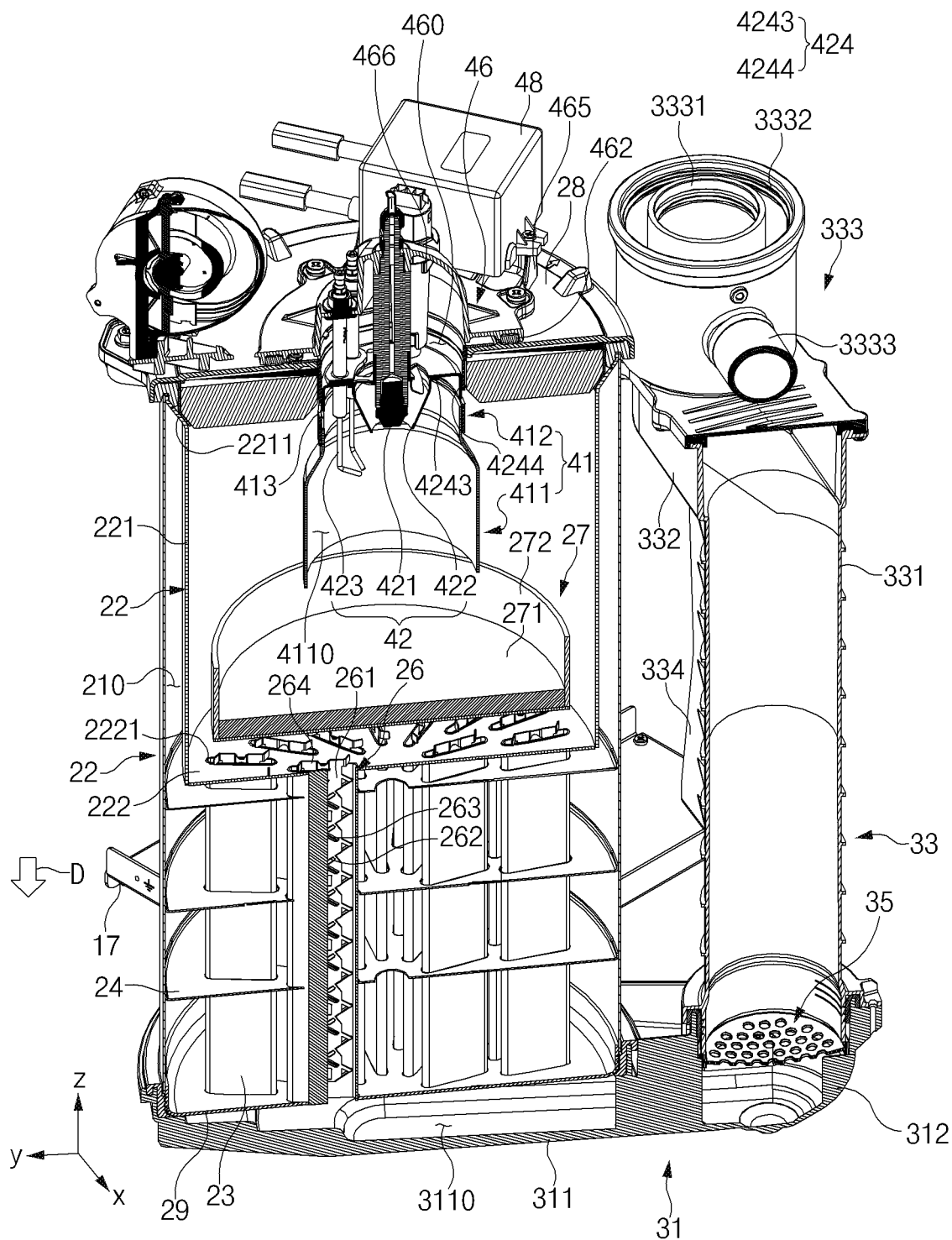
FIG. 5 is a perspective view including a vertical section of the oil boiler according to an embodiment of the present disclosure.

FIG. 1 is a perspective view of an oil boiler 1 according to an embodiment of the present disclosure. FIG. 2 is a view illustrating a situation in which a case 10 of the oil boiler 1 is removed according to an embodiment of the present disclosure. FIG. 3 is an exploded perspective view of the oil boiler 1 according to an embodiment of the present disclosure. FIG. 4 is a vertical sectional view of the oil boiler 1 according to an embodiment of the present disclosure. FIG. 5 is a perspective view including a vertical section of the oil boiler 1 according to an embodiment of the present disclosure.

Referring to the drawings, the oil boiler 1 according to an embodiment of the present disclosure may be provided in a form in which other components are embedded in a case space 14 of the case 10.

Case 10

The case 10 may have an outer container 21 therein and may be defined by a plurality of walls. In an embodiment of the present disclosure, the case 10 may have a rectangular parallelepiped shape. The case 10 may be formed in such a manner that an upper wall 11 located on an upper side, a lower wall 13 disposed to be opposite the upper wall 11, and four sidewalls 12 connecting the upper wall 11 and the lower wall 13 define the case space 14 inside. However, the number of walls and the arrangement thereof are not limited thereto. The sidewalls 12 may extend downward from the upper wall 11 having a rectangular shape.

In the drawings, handles 1212 are illustrated as being formed on a first sidewall 121. However, the handles 1212 may be disposed on a third sidewall 123 opposite the first sidewall 121. In the drawings, horizontal directions may refer to directions parallel to the plane defined by the x-axis and the y-axis illustrated, and a vertical direction may refer to a direction defined by the z-axis.

The handles 1212 may be provided on two sidewalls 12 facing each other in one of the horizontal directions among the sidewalls 12. Accordingly, a user may easily move the oil boiler 1 while holding the handles 1212.

A controller 15 may be disposed on one of the sidewalls 12. The controller 15 may include an operation device 151 and a processor 152. The operation device 151 may include a mechanical structure that can be operated by the user and a display device capable of representing a state of the oil boiler 1 and may be electrically connected with the processor 152. In an embodiment of the present disclosure, the controller 15 is illustrated as being disposed on a second sidewall 122. However, the position of the controller 15 is not limited thereto.

The processor 152 may be a component electrically connected to components of the oil boiler 1 to perform control. The processor 152 may be a component that includes an element capable of a logic operation of performing a control command. The processor 152 may include a central processing unit (CPU). The processor 152 may be connected to components such as a differential pressure acquisition device 47, a blower 44, a fuel pump device 45, and the like and may transfer signals to the components depending on control commands. The processor 152 may be connected to various sensors or acquisition devices and may receive obtained information in the form of a signal. The processor 152 may be electrically connected with the components. The processor 152 may be wiredly connected to the components, or may additionally have a communication module capable of wireless communication to communicate with the components.

The control commands that the processor 152 performs may be stored and utilized on a storage medium, and the storage medium may be, but is not limited to, a device such as a hard disk drive (HDD), a solid state drive (SSD), a server, a volatile medium, a nonvolatile medium, or the like. In addition, data required for the processor 152 to perform tasks may be additionally stored in the storage medium.

In addition, an expansion tank 16 may be received in the case space 14. The expansion tank 16 may be a container connected with the outer container 21 to allow for volume expansion of heating water.

Outer Container 21

The outer container 21 may be a component formed in a cylindrical shape and may receive a combustion chamber 22, diaphragms 24, flue tubes 23, and the like in a cylindrical empty space 210 formed inside. The outer container 21 may be formed of stainless steel. Components embedded in the outer container 21 may be integrally formed with the outer container 21 and may be identically formed of stainless steel to make the entire oil boiler 1 light.

The outer container 21 may have openings formed at opposite ends thereof and may have the empty space 210 formed therein, the empty space 210 being connected to the openings at the opposite ends. The outer container 21 may have, on a lower side thereof, an outer container inlet 211 through which heating water is introduced into the empty space 210 and may have, on an upper side thereof, an outer container outlet 212 through which the heating water is drained from the empty space 210. The heating water introduced through the outer container inlet 211 may flow along the empty space 210 and may be drained through the outer container outlet 212. The heating water may be heated by receiving thermal energy from the high-temperature flue tubes 23 and the high-temperature combustion chamber 22 while flowing in the empty space 210. The heated heating water may be drained through the outer container outlet 212 and may perform heating while passing through a heating pipe (not illustrated).

The outer container 21 may include an outer container extension 213 that extends along the vertical direction and serves as a wall of the outer container 21, and may be formed in a cylindrical shape in which a lower end and an upper end of the outer container extension 213 are open.

Combustion Chamber 22

The opening at the upper end of the outer container 21 may be covered by the combustion chamber 22. Here, the expression "the combustion chamber 22 covers the opening"

may mean that the combustion chamber 22 completely covers, from the outside, the periphery of the opening located at the upper end of the outer container 21. However, the combustion chamber 22 may be expressed as covering the opening even when the combustion chamber 22 is coupled in such a manner that the combustion chamber 22 is inserted into the opening of the outer container 21 and is coupled to an inner circumferential surface of the empty space 210 of the outer container 21 to isolate the empty space 210 from the outside, with the periphery of the opening protruding toward the outside.

The combustion chamber 22 may be a cylindrical component that covers the opening at the upper end of the outer container 21. The combustion chamber 22 may have an interior space 220 therein, and a burner 42 inserted into the interior space 220 may cause a combustion reaction. The combustion reaction may occur in the interior space 220 to generate a flame and combustion gas.

The combustion chamber 22 formed in a cylindrical shape may extend from the upper end of the outer container 21 toward the lower end of the outer container 21, but may not reach the lower end of the outer container 21. The burner 42 may be disposed in the interior space 220 of the combustion chamber 22 and may heat the combustion chamber 22 to transfer heat to the heating water. Furthermore, the burner 42 may generate the combustion gas by heating gas received in the combustion chamber 22. The combustion gas generated by heating of the burner 42 may be released from the combustion chamber 22 to the outside through the flue tubes 23. In this process, the combustion gas passing through the flue tubes 23 may heat the heating water passing through the empty space 210.

The combustion chamber 22 may include an inner bottom surface 222. The surface located at a lower end of the combustion chamber 22 may be the inner bottom surface 222. The inner bottom surface 222 may have bottom surface through-holes 2221 formed therein, and the flue tubes 23, which will be described below, may pass through the bottom surface through-holes 2221. That is, the inner bottom surface 222 may be connected to the outside by the flue tubes 23. The inner bottom surface 222 may be removable from the combustion chamber 22 or may be integrally formed with the combustion chamber 22. The inner bottom surface 222 may be formed in a horizontal circular shape. However, the shape of the inner bottom surface 222 is not limited thereto.

An upper end of the combustion chamber 22 may be formed to have a diameter corresponding to the upper end of the outer container 21 and may be coupled with the upper end of the outer container 21 to close the upper end of the outer container 21 to form the closed empty space 210 of the outer container 21. However, the diameter of a combustion chamber extension that extends from the upper end of the outer container 21 toward the lower end of the outer container 21 may be smaller than the diameter of the outer container 21. Accordingly, the combustion chamber 22 may have a combustion chamber connecting part 2211 that extends from the combustion chamber extension to the upper end of the combustion chamber 22 and has a tapered shape. An inner side surface of the combustion chamber extension may be an inner side surface 221 of the combustion chamber 22.

The combustion chamber 22 and the outer container 21 may have a cylindrical shape, and the combustion chamber extension may have a smaller diameter than the outer container 21 such that the combustion chamber extension is spaced apart from an inner side surface of the outer container 21. Accordingly, a flow space may be formed between the inner side surface of the outer container 21 and an outer side surface of the combustion chamber extension.

The heating water may flow from the empty space 210 through the flow space. The outlet 212 of the outer container 21 that is formed at the upper end of the outer container 21 may be connected to the flow space. Accordingly, the heating water flowing in the flow space may be guided to the outer container outlet 212 and may be drained through the outer container outlet 212. The heating water flowing in the flow space may finally receive heat from the combustion chamber 22 heated by the flame of the burner 42 and may be drained through the outer container outlet 212 formed on the outer container 21.

An opening formed at the upper end of the combustion chamber 22 may be hidden by a combustion chamber cover 28. Components of the burner 42, which will be described below, may pass through the combustion chamber cover 28.

Heat Exchanger (Flue Tubes 23, Diaphragms 24, and Lower Cover 29)

The oil boiler 1 according to an embodiment of the present disclosure may include the heat exchanger. The heat exchanger may include the flue tubes 23 and the diaphragms 24, and these components may be surrounded by the outer container 21, the lower cover 29, and the combustion chamber 22. When the outer container 21 is formed in a cylindrical shape, the heat exchanger may be a shell-and-tube type heat exchanger. The combustion gas may pass through the flue tubes 23, and the heating water may flow around the flue tubes 23 in the empty space 210 to exchange heat with the combustion gas. The combustion gas may pass through the heat exchanger in a lower direction, and accordingly a top-down heat exchanger may be formed.

The lower cover 29 included in the oil boiler 1 may cover the opening at the lower end of the outer container 21, and the flue tubes 23 may pass through the lower cover 29. Accordingly, the heating water may be located in a region of the empty space 210 that is defined by the lower cover 29, the combustion chamber 22, and the outer container 21.

The flue tubes 23 may be disposed between the lower cover 29 and the combustion chamber 22. The flue tubes 23 may be tubular components connected to the interior space 220 of the combustion chamber 22 and a space of a condensate receiver 31 formed under the lower cover 29. Accordingly, the flue tubes 23 may guide the combustion gas generated from the combustion chamber 22, to a lower place than the lower cover 29 through the empty space 210 of the outer container 21. According to an embodiment of the present disclosure, the flue tubes 23 may extend along the vertical direction. The heated combustion gas may move downward D through the flue tubes 23. In the process in which the combustion gas moves, heat exchange between the heating water moving upward through the empty space 210 of the outer container 21 and the combustion gas moving downward D may be performed through the flue tubes 23.

The flue tubes 23 may be radially disposed from the center of the circular cross-section of the outer container 21 and the combustion chamber 22. The center of the circular cross-section may be the same as the center of the diaphragms 24 in a circular plate shape that will be described below. Accordingly, as in an embodiment of the present disclosure, the flue tubes 23 may be disposed along one circumference at predetermined intervals. Alternatively, the flue tubes 23 may be disposed in two stages by being disposed at predetermined intervals along two circumferences having different diameters. However, the arrangement of the flue tubes 23 is not limited thereto.

The flue tubes 23 may be provided in a flat tube type. Specifically, when widths defined in two directions extending to be perpendicular to each other on a horizontal plane are referred to as a first width and a second width, the flue tubes 23 may be formed in a shape in which the second width of an internal flow passage through which the combustion gas passes is smaller than the first width of the internal flow passage. The outer container 21 may be formed in the shape of a cylinder. Therefore, the first width may be parallel to the radial direction of the cylinder, and the second width may be parallel to the circumferential direction of the cylinder.

A turbulator 26 may be disposed in each of the flue tubes 23. The turbulator 26 may be an apparatus for turning the flow of the combustion gas passing through the flue tube 23 into a turbulent flow. Specifically, the turbulator 26 may include a plate 261 extending in the vertical direction, a plurality of through-portions 262 formed through the plate 261, and a plurality of protrusions 263 protruding from the plate 261. As the plate 261 inserted into the flue tube 23 has the plurality of through-portions 262 and the plurality of protrusions 263, the flow of the combustion gas passing through the flue tube 23 may be turned into a turbulent flow while being hampered or accelerated.

The turbulator 26 may further include a stopper 264 protruding form an upper end of the plate 261 in one direction among the horizontal directions so as to be stopped by the inner bottom surface 222 of the combustion chamber 22 when the turbulator 26 is inserted into the flue tube 23 downward D from above the flue tube 23. The stopper 264, which protrudes form the plate 261 in one direction among the horizontal directions, may be bent to more stably fix the plate 261 to the inner bottom surface 222 of the combustion chamber 22. Furthermore, the turbulator 26 formed as described above may be easily separated from the inner bottom surface 222, and accordingly the oil boiler 1 may be easy to clean.

The diaphragms 24 may be disposed in the empty space 210 formed in the outer container 21. The diaphragms 24 may be components formed in a circular plate shape and may be disposed between the lower cover 29 and the combustion chamber 22 in one direction among the horizontal directions.

The diaphragms 24 may have through-holes that are formed in positions corresponding to the positions of the flue tubes 23 and through which the flue tubes 23 pass. As the diaphragms 24 divide the empty space 210 into a plurality of areas, the diaphragms 24 may form a flow passage through which the heating water flowing in the empty space 210 moves. As illustrated, the diaphragms 24 may make the flow passage of the heating water more complex.

The shell-and-tube type heat exchanger having the above-described structure may have higher thermal efficiency than other heat exchangers including an exemplary heat exchanger of a bottom-up combustion type. Accordingly, the temperature of the finally released combustion gas may be lower than the temperature of combustion gas released from the exemplary heat exchanger. Accordingly, a flue 53 (refer to FIG. 15) that is coupled to the oil boiler 1 to finally release the combustion gas to the outside may be formed of plastic rather than metal.

Condensate Receiver 31

The condensate receiver 31 may be a component that receives and drains condensate. The condensate receiver 31 may be located under the lower cover 29. Accordingly, the condensate receiver 31 may receive condensate that falls from a lower surface of the lower cover 29 or the insides of the flue tubes 23.

The condensate receiver 31 of the oil boiler 1 according to an embodiment of the present disclosure may include a receiving part 311 having a receiving space 3110 between the lower cover 29 and the receiving part 311 to receive the falling condensate and may further include a separator 312 connected with the receiving part 311 and a duct 33. Furthermore, a condensate pipe 341 may connect the separator 312 and a trap device 32 and may deliver the condensate to the trap device 32. The condensate may be delivered from the separator 312 to the trap device 32 through the condensate pipe 341 by the weight of the condensate, and the combustion gas may be directed upward through the duct 33.

A silencer 35 may be disposed in the separator 312. A situation in which the silencer 35 is disposed in the receiving part 311 may be considered. However, in this case, the height of the receiving part 311 in the vertical direction may be increased. Accordingly, as the silencer 35 is disposed in the separator 312 connected with the duct 33, the height of the receiving part 311 may be reduced, and thus the overall height of the oil boiler 1 may be reduced.

Specifically, the silencer 35 may be formed of a porous plate and may generate resistance to a flow of the combustion gas released to the duct 33 through the receiving part 311. As the silencer 35 generates the resistance to the flow of the combustion gas, the processor 152 may control an impeller 441 (refer to FIG. 11) of the blower 44 to rotate at higher speed than when the silencer 35 is not present. Accordingly, a larger amount of air may be supplied to an air nozzle 422 through the blower 44, and the combustion gas may be easily pushed and released through the flue tubes 23 and the duct 33. Thus, the air or the combustion gas may be prevented from flowing backward, and ignition noise may be reduced. How the processor 152 controls the blower 44 depending on the generation of the resistance to the flow of the combustion gas will be described below in relation to an air supply pipe 51.

As the ignition noise is reduced, the combustion chamber 22 may have a smaller size than a combustion chamber of an oil boiler that fails to reduce ignition noise, and the height of the combustion chamber 22 may be reduced. Thus, an effect of reducing the overall height of the oil boiler 1 may be obtained.

Duct 33

The separator 312 may be connected with the tubular duct 33 extending upward and may release the combustion gas to the outside through the duct 33. The duct 33 may not extend in only one direction and may include a linear duct portion 331 that extends in the vertical direction and into which the combustion gas released from the outer container 21 is introduced, a flue connecting adaptor 333 formed to include an outlet of the duct 33, and a horizontal duct portion 332 extending in one direction among the horizontal directions and connecting the linear duct portion 331 and the flue connecting adaptor 333.

The horizontal duct portion 332 may extend from an upper end of the linear duct portion 331 in a horizontal direction. The flue connecting adaptor 333 may be connected to a position on the horizontal duct portion 332 that is spaced apart from the linear duct portion 331 in one direction among the horizontal directions. Accordingly, the linear duct portion 331 and the flue connecting adaptor 333 may be spaced apart from each other along the one direction among the horizontal directions.

The overall height of the oil boiler 1 in the vertical direction may be affected by the length of the duct 33. The duct 33 formed as described above may reduce the overall height in the vertical direction while increasing the overall length.

The duct 33 may include the linear duct portion 331, the flue connecting adaptor 333, and the horizontal duct portion 332 connecting the linear duct portion 331 and the flue connecting adaptor 333 in one direction among the horizontal directions. Accordingly, the duct 33 may not be formed straight in one direction and may have an eccentric unbalanced structure. For example, the flue 53 (refer to FIG. 15) may press the flue connecting adaptor 333 downward D while being coupled to an inlet of the duct 33. In this situation, the horizontal duct portion 332 may be subjected to bending moment because opposite ends of the horizontal duct portion 332 are connected to the force-receiving flue connecting adaptor 333 and the linear duct portion 331 fixed to the separator 312. The force applied when the flue 53 (refer to FIG. 15) is coupled may be transmitted to the linear duct portion 331 through the horizontal duct portion 332 to damage the linear duct portion 331 or the horizontal duct portion 332.

To prevent the damage, the duct 33 may further include a duct support 334. The duct support 334 may extend outward from the linear duct portion 331 and may be connected to the horizontal duct portion 332. The duct support 334 may be seated on a fixing bracket 17 that is fixed to a case bracket 1233 protruding inward from an inner side surface of the case 10 and that fixes the outer container 21. The duct support 334 may be seated on the fixing bracket 17. However, the duct support 334 may be fixed to the fixing bracket 17 by a fastener even though not seated on the fixing bracket 17. Likewise, the fixing bracket 167 may also be seated on the case bracket 1233, but may be fixed to the case bracket 1233 by a fastener even though not seated on the case bracket 1233.

The fixing bracket 17 may be provided on an outer surface of the outer container extension 213 of the outer container 21. As the duct support 334 is fixed to the fixing bracket 17, the duct 33 may be supported by the fixing bracket 17 or the case bracket 1233 through the duct support 334 even when the above-described force is applied to the duct 33, and thus damage to the duct 33 may be prevented.

Burner 42

The burner 42 may be a component that ignites fuel of an oil type and air to generate a flame and combustion gas. To enable this operation, the burner 42 may include a fuel nozzle 421, the air nozzle 422, and a spark plug 423.

The fuel nozzle 421 may be a nozzle that sprays the fuel of an oil type into the interior space 220 of the combustion chamber 22. The fuel nozzle 421 may be connected to the fuel pump device 45 through a fuel supply pipe 4512. The fuel nozzle 421 may receive the fuel of an oil type from the fuel pump device 45 and may spray the fuel into the interior space 220 at the pressure by which the fuel pump device 45 forcibly delivers the fuel. Accordingly, the flow rate at which the fuel nozzle 421 sprays the fuel may be determined by the fuel pump device 45. The fuel nozzle 421 may be disposed to pass through the combustion chamber cover 28. The sprayed fuel of an oil type may be gasified by the high-temperature combustion gas circulating through recirculation holes 413 of a flame tube part 41 that will be described below.

The air nozzle 422 may inject the air into the interior space 220 of the combustion chamber 22. The air nozzle 422 may be formed to surround the fuel nozzle 421. The air may be injected through an air injection opening formed between an outer side surface of the fuel nozzle 421 and an inner side surface of the air nozzle 422. The fuel nozzle 421 may have a shape in which a lower end portion thereof has a gradually decreasing width in the downward direction D, and the air nozzle 422 may also have a shape in which a lower end portion thereof has a gradually decreasing width in the downward direction D.

The ratio of the flow rate of the air injected by the air nozzle 422 to the flow rate of the fuel sprayed by the fuel nozzle 421 may be maintained to be a predetermined ratio. The ratio of the flow rate of the air injected by the air nozzle 422 to the flow rate of the fuel sprayed by the fuel nozzle 421 may be a ratio suitable for generating a blue flame. The processor 152 may control the air flow rate, which is the flow rate of the air injected by the air nozzle 422, and the fuel flow rate, which is the flow rate of the fuel sprayed by the fuel nozzle 421. The processor 152 may control the blower 44, which supplies the air to the air nozzle 422, to adjust the flow rate of the air supplied to the air nozzle 422. The processor 152 may control the fuel pump device 45, which supplies the fuel to the fuel nozzle 421, to adjust the flow rate of the fuel supplied to the fuel nozzle 421.

The burner 42 may include the spark plug 423. The spark plug 423 may be a component that ignites a mixture of the sprayed fuel and the injected air. The spark plug 423 may create an electric spark to ignite the mixture. A blue flame may be generated as the electric spark is created in the situation in which the fuel of an oil type is sprayed and thereafter gasified by the circulating combustion gas and the gasified fuel and the air are mixed to form the mixture. Accordingly, the oil boiler 1 may be a blue-flame type oil boiler 1.

The burner 42 may further include a burner fixing plate 424 to which the spark plug 423, the fuel nozzle 421, and the air nozzle 422 are fixed. The burner fixing plate 424 may be formed in a plate shape and may be fixedly inserted into an upper flame tube 412, which will be described below, to prevent air blown into a burner space 460 (refer to FIG. 8) by the blower 44 from moving to the flame tube part 41 without passing through the air nozzle 422.

The burner fixing plate 424 included in the burner 42 and a burner housing 46 that forms the burner space 460 between the burner fixing plate 424 and the combustion chamber cover 28 will be described below with reference to FIG. 8.

Flame Tube Part 41

Figure 6:
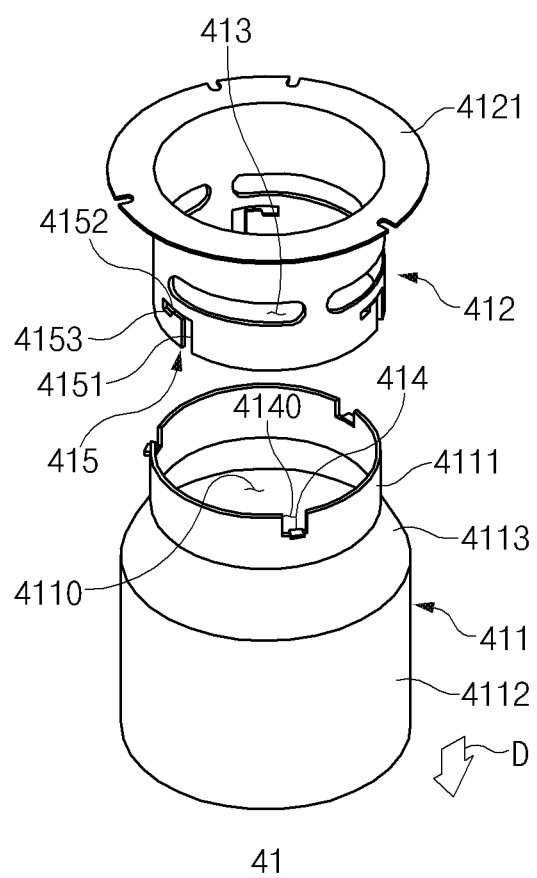
FIG. 6 is an exploded perspective view of a flame tube part of the oil boiler according to an embodiment of the present disclosure.
Figure 7:
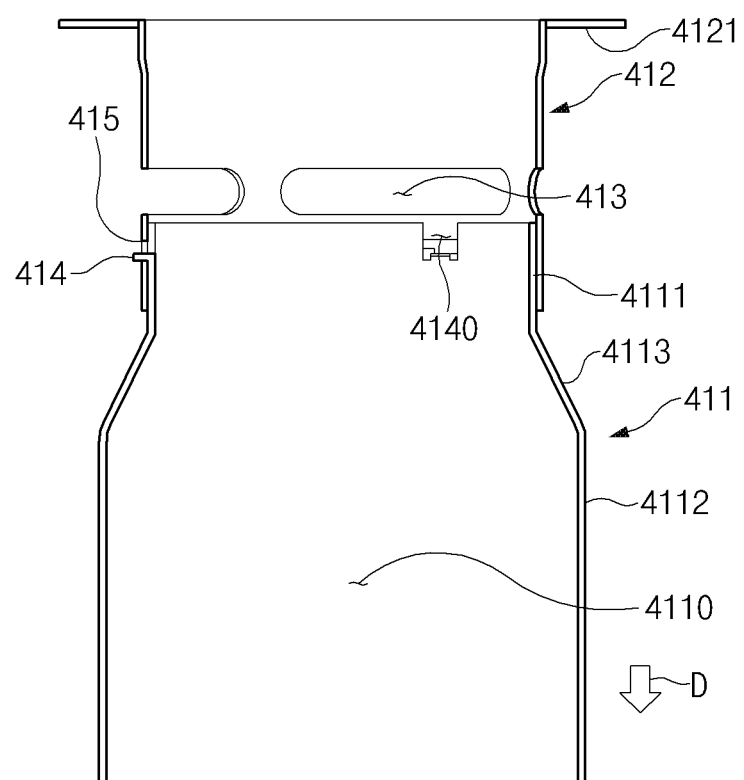
FIG. 7 is an enlarged vertical sectional view of a portion of the flame tube part of the oil boiler according to an embodiment of the present disclosure.

FIG. 6 is an exploded perspective view of the flame tube part 41 of the oil boiler 1 according to an embodiment of the present disclosure. FIG. 7 is an enlarged vertical sectional view of a portion of the flame tube part 41 of the oil boiler 1 according to an embodiment of the present disclosure.

The flame tube part 41 will be described below with additional reference to FIGS. 6 and 7. The flame tube part 41 may be a part in which a flame generated by the burner 42 is located. The flame tube part 41 may include lower and upper flame tubes 411 and 412 and the recirculation holes 413.

The recirculation holes 413 may be openings formed in the upper flame tube 412. The recirculation holes 413 may be formed such that the combustion gas passes through the recirculation holes 413. When the fuel and the air are emitted at high pressure from the inside of the flame tube part 41 through the nozzles 421 and 422, surrounding pressure may be lowered by the flow of the fluids sprayed at the high pressure, and therefore the combustion gas located outside the flame tube part 41 may be introduced through the recirculation holes 413 into the flame tube part 41, the pressure of which is lowered. The recirculation holes 413 may be formed through the upper flame tube 412 such that the combustion gas in the interior space 220 of the combustion chamber 22 is introduced from the outside of the lower and upper flame tubes 411 and 412 into a tube space 4110 located inside the lower and upper flame tubes 411 and 412.

The recirculation holes 413 may be formed in a slot shape that extends along the circumferential direction of the upper flame tube 412 that will be described below. The recirculation holes 413 may be disposed to be spaced apart from each other along the circumferential direction of the upper flame tube 412.

The combustion gas generated by the burner 42 may meet a combustion guide 27 while flowing downward D, and the flow direction of the combustion gas may be changed to an upper direction by the combustion guide 27. The combustion gas, the flow direction of which is changed to the upper direction, may reach the outside of the lower and upper flame tubes 411 and 412 and may be introduced into the tube space 4110 through the recirculation holes 413. The combustion gas may be circulated in this way.

The tube space 4110 may be a space in which the mixture of the fuel and the air is ignited, and the flame tube part 41 in the interior space 220 may define the tube space 4110 by surrounding a partial space in which the mixture of the sprayed fuel of an oil type and the injected air is ignited. Part of the fuel nozzle 421 and part of the air nozzle 422 may be received in the tube space 4110.

The circulating high-temperature combustion gas may gasify the fuel of an oil type that is sprayed by the fuel nozzle 421 and that exists in a droplet state. The oil boiler 1 may change the fuel of an oil type to a gaseous state and may ignite the gaseous fuel. Accordingly, similarly to a boiler that uses fuel of a gas type, the oil boiler 1 may generate a high-temperature blue flame rather than a low-temperature yellow flame and may achieve high fuel efficiency. In addition, the oil boiler 1 may use components similar to those of the boiler that uses the fuel of a gas type.

As the combustion gas circulates, the temperature of the flame generated in the lower and upper flame tubes 411 and 412 may be lowered, as compared with when fuel and air are ignited in a situation in which only the fuel and the air exist simply. As the temperature of the flame is lowered, the amount of nitrogen oxide generated at high temperature may be reduced.

The lower and upper flame tubes 411 and 412 may be components that are open at lower ends and that surround, in the interior space 220, an area to which the fuel is sprayed from the fuel nozzle 421.

The flame tube part 41 may have a first tube part 4111, a second tube part 4112, and a connecting tube part 4113 connecting the first tube part 4111 and the second tube part 4112. These tube parts may be included in the lower flame tube 411.

Specifically, the first tube part 4111 and the second tube part 4112 may be formed in a cylindrical shape, and the first tube part 4111 may be located in a higher position than the second tube part 4112. The cross-section of the second tube part 4112 may have a larger diameter than the cross-section of the first tube part 4111. The connecting tube part 4113 may connect the first tube part 4111 and the second tube part 4112. Because there is a difference in diameter between the tube parts 4111 and 4112, the connecting tube part 4113 may be formed in a frusto-conical shape. The connecting tube part 4113 may have a shape in which the diameter of the cross-section gradually increases in the downward direction D.

As the flame tube part 41 has the tube parts and has a shape in which the diameter of the cross-section gradually increases in the downward D direction, a flame having a greater width in a lateral direction than a flame in a straight tube having the same diameter may be formed.

Furthermore, as the flame tube part 41 is formed in a tapered shape as described above, a flame sufficient to produce the combustion gas for heating the heating water and generate radiant heat may be formed even though the height of the combustion chamber 22 is reduced.

The flame tube part 41 formed in a tapered shape may form a wide flame rather than a long flame such that the flame does not reach the lower cover 29. As the flame does not reach the lower cover 29, noise and soot may be reduced during ignition and combustion.

The flame tube part 41 may be divided into the upper flame tube 412 and the lower flame tube 411. The upper flame tube 412 may have, at an upper end thereof, a tube flange 4121 protruding outward from a cylindrical body in the radial direction so as to be fixedly coupled to the combustion chamber cover 28. The tube flange 4121 may be seated on the combustion chamber cover 28 and may be fastened to the combustion chamber cover 28 by a fastener.

The recirculation holes 413 may be formed in the upper flame tube 412, and the lower flame tube 411 may be coupled to the upper flame tube 412 so as to be located below the recirculation holes 413. The upper flame tube 412 may have a shape protruding downward D from the combustion chamber cover 28. The lower flame tube 411 may be coupled to a lower area of the upper flame tube 412. A method of assembling the upper flame tube 412 and the lower flame tube 411 will be described below with additional reference to FIGS. 6 and 7.

Referring to the drawings, a tube hole 415 may be formed in the upper flame tube 412, and a tube protrusion 414 may be formed on the lower flame tube 411. As the tube protrusion 414 is inserted into the tube hole 415 and is operated, the upper flame tube 412 and the lower flame tube 411 may be coupled together, and the relative positions of the upper flame tube 412 and the lower flame tube 411 may be fixed.

The tube protrusion 414 may be formed on the first tube part 4111. Specifically, the tube protrusion 414 may protrude outward from a position adjacent to an upper end of the lower flame tube 411. The tube protrusion 414 may be formed by folding, toward the outside, a portion extending downward D from the upper end of the lower flame tube 411. However, the forming method is not limited thereto.

A lower hole 4140 may be a hole formed upward from the tube protrusion 414 to an upper end of the first tube part 4111. The lower hole 4140 may be formed through the first tube part 4111 in the radial direction.

The lower hole 4140 may have a larger size than the tube protrusion 414. Specifically, the lower hole 4140 and the tube protrusion 414, as illustrated, may be formed by forming two holes having a predetermined size at a predetermined interval along the circumferential direction of the first tube part 4111 through punching and thereafter folding, in the radially outward direction, the protruding portion left between the two holes. However, the forming method is not limited thereto.

The tube hole 415 may be formed through the upper flame tube 412 in the radial direction. Specifically, the tube hole 415 may include a vertical hole portion 4151 extending upward from the lower end of the upper flame tube 412. The length of the vertical hole portion 4151 in the vertical direction is referred to as a first distance.

A horizontal hole portion 4152 may extend from an upper end of the vertical hole portion 4151 in one direction along the circumference of the upper flame tube 412. As the upper flame tube 412 is formed in a cylindrical shape, the horizontal hole portion 4152 may be formed along the circumferential direction of the upper flame tube 412.

The tube hole 415 may include a stopper hole portion 4153 extending downward D from a distal end of the horizontal hole portion 4152. In the vertical direction, the stopper hole portion 4153 may have a length corresponding to a second distance smaller than the first distance.

A plurality of tube holes 415 may be formed to be spaced apart from each other at predetermined intervals along the circumference of the upper flame tube 412, and a plurality of tube protrusions 414 may be formed to be spaced apart from each other at predetermined intervals along the circumference of the lower flame tube 411. An equal number of tube holes 415 and tube protrusions 414 may be formed, and the tube protrusions 414 may be inserted into the tube holes 415, respectively.

The tube protrusions 414 may be inserted into the vertical hole portions 4151 by aligning the tube protrusions 414 with the tube holes 415 and thereafter moving the lower flame tube 411 upward. The tube protrusions 414 may be moved along the horizontal hole portions 4152 by rotating the lower flame tube 411 about the axis thereof that is oriented in the vertical direction. The lower flame tube 411 may be moved downward D, and the tube protrusions 414 may be stopped by the stopper hole portions 4153.

As the lower and upper flame tubes 411 and 412 are assembled by the above-described method, the lower and upper flame tubes 411 and 412 may not be easily separated by vibration or shake. The lower flame tube 411 and the upper flame tube 412 may simply make contact with each other without being fused or integrated with each other by welding or without being firmly coupled with each other by a separate fastener such as a bolt and nut. Accordingly, the lower and upper flame tubes 411 and 412 may not be deformed by heat generated by welding and may be prevented from being corroded or damaged by a fastener at high temperature. In addition, the amount of heat transferred from the high-temperature lower flame tube 411 to the upper flame tube 412 may be reduced.

Furthermore, the upper flame tube 412 and the lower flame tube 411 may be provided as separate objects. The lower flame tube 411 may be formed of a material capable of maintaining the structure and the physical characteristics even at high temperature, and the upper flame tube 412 may be formed of a material relatively vulnerable to high temperature. Because a material capable of resisting high temperature is very expensive, an economical boiler configuration is possible, as compared with when an integrated flame tube is formed.

Combustion Guide 27

The combustion guide 27 may be a component disposed in the interior space 220 of the combustion chamber 22 to change the flow direction of the combustion gas to the opposite direction. The burner 42 may cause a combustion reaction, and combustion gas generated by the combustion reaction may flow downward D. The combustion gas flowing downward D may meet the combustion guide 27, and the flow direction of the combustion gas may be changed to the upper direction by the combustion guide 27. Accordingly, the combustion guide 27 may be located below the burner 42 and the flame tube part 41.

The combustion guide 27 may include a blocking plate 271, a guide wall 272, and a guide leg 273. The blocking plate 271 may be disposed to be spaced apart from the inner side surface 221 of the combustion chamber 22 and may be formed in a plate shape. As the interior space 220 of the combustion chamber 22 is formed in a cylindrical shape, the blocking plate 271 may be formed in a circular plate shape. The combustion gas, while moving downward D, may collide with and reflect back from the blocking plate 271 and may move upward. Furthermore, the blocking plate 271 may be located between the inner bottom surface 222 of the combustion chamber 22 and the burner 42, and accordingly a flame may reach the blocking plate 271 without making direct contact with the inner bottom surface 222 of the combustion chamber 22. As the flame does not make direct contact with the inner bottom surface 222 of the combustion chamber 22, acoustic boiling noise that heating water below the inner bottom surface 222 rapidly boils to generate may be reduced.

The guide wall 272 may extend upward from the blocking plate 271 and may be formed along the periphery of the blocking plate 271. Accordingly, the guide wall 272 may be formed in an annular shape. The guide wall 272 may surround an area above the blocking plate 271, and accordingly the combustion gas reflected from the blocking plate 271 may move upward along the guide wall 272.

Part of the combustion gas moved upward by the guide wall 272 may circulate into the flame tube part 41 through the recirculation holes 413. The remainder may collide with the combustion chamber cover 28 or a nozzle flange, and the flow direction may be changed to the downward direction D again. Accordingly, the remaining combustion gas may move downward D through a space formed between the guide wall 272 and the inner side surface 221 of the combustion chamber 22.

The guide leg 273 may be a component extending downward D from the blocking plate 271. The guide leg 273 may extend downward D from the blocking plate 271, and a lower end of the guide leg 273 may make contact with the inner bottom surface 222 of the combustion chamber 22. Accordingly, the guide leg 273 may support the blocking plate 271 above the inner bottom surface 222 of the combustion chamber 22. The blocking plate 271 may be spaced apart from the inner bottom surface 222 of the combustion chamber 22 by the guide leg 273, and the combustion gas flowing through the space between the blocking plate 271 and the inner side surface 221 of the combustion chamber 22 may move downward D through the flue tubes 23 disposed to pass through the inner bottom surface 222 of the combustion chamber 22.

Accordingly, the oil boiler 1 may have a reverse combustion structure in which the direction of the combustion gas is changed to the opposite direction by the combustion guide 27. As a result, the combustion gas may circulate into the flame tube part 41, and the flame may not make direct contact with the inner bottom surface 222 of the combustion chamber 22, which results in a reduction in acoustic boiling noise of heating water.

As the oil boiler 1 has the reverse combustion structure, the combustion gas may stay in the combustion chamber 22 for a long period of time, as compared with when the oil boiler 1 does not have the reverse combustion structure. Accordingly, heat may be transferred to the top of the combustion chamber 22, which results in a rise in thermal efficiency. Furthermore, when the oil boiler 1 does not have the combustion guide 27, foreign matter such as soot generated in a combustion process may be introduced into the flue tubes 23. However, in the embodiment of the present disclosure in which the oil boiler 1 has the combustion guide 27, the foreign matter such as soot may be accumulated on the combustion guide 27. Accordingly, the oil boiler 1 may be more cleanly used, and a heat exchange rate may be raised.

A heat insulating material (not illustrated) may be disposed on the combustion guide 27 to achieve heat and sound insulation effects. The heat insulating material may be, but is not limited to, Cerakwool.

Blower 44

Figure 8:
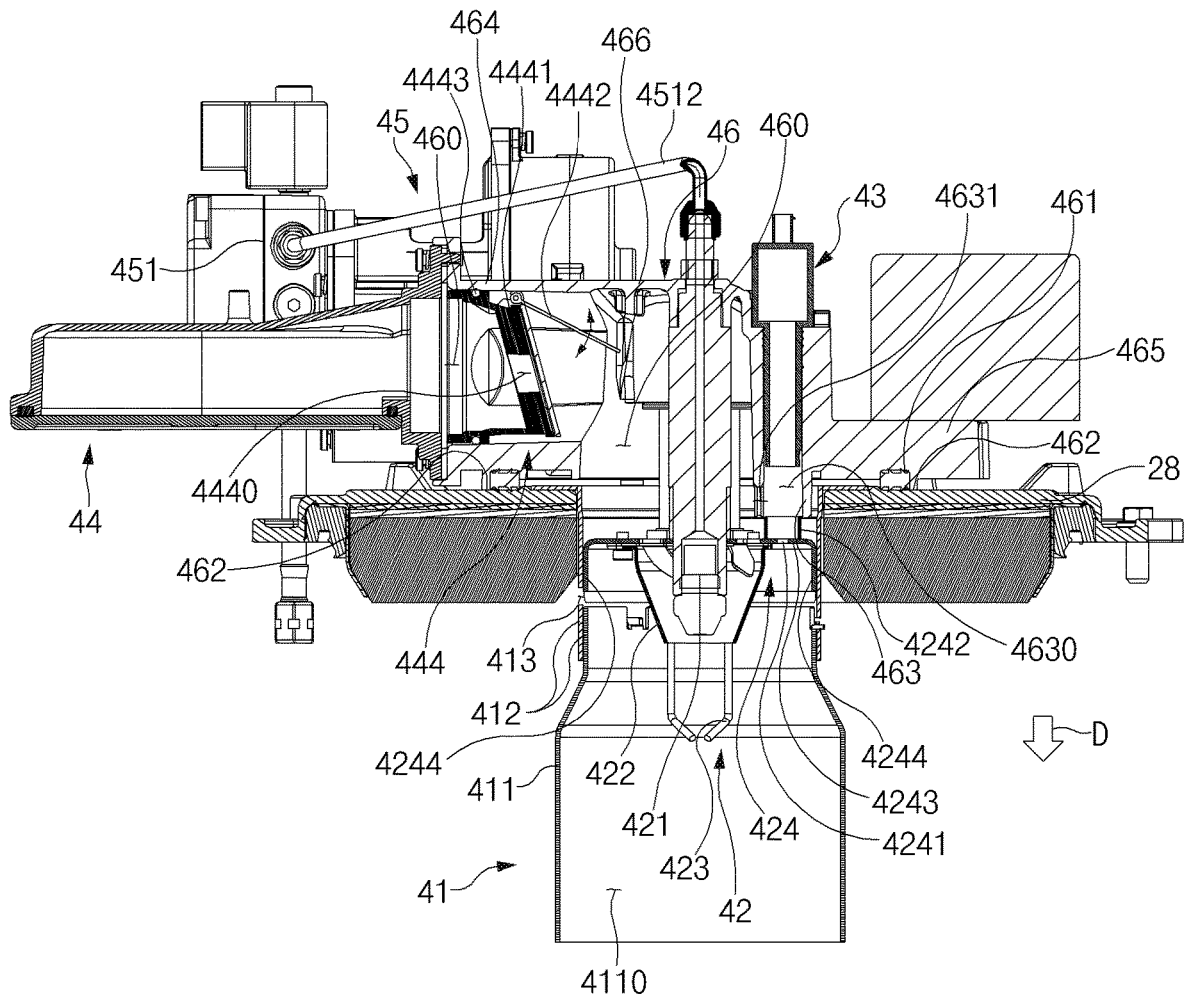
FIG. 8 is a sectional view of a part blowing air to a burner of the oil boiler according to an embodiment of the present disclosure.
Figure 9:
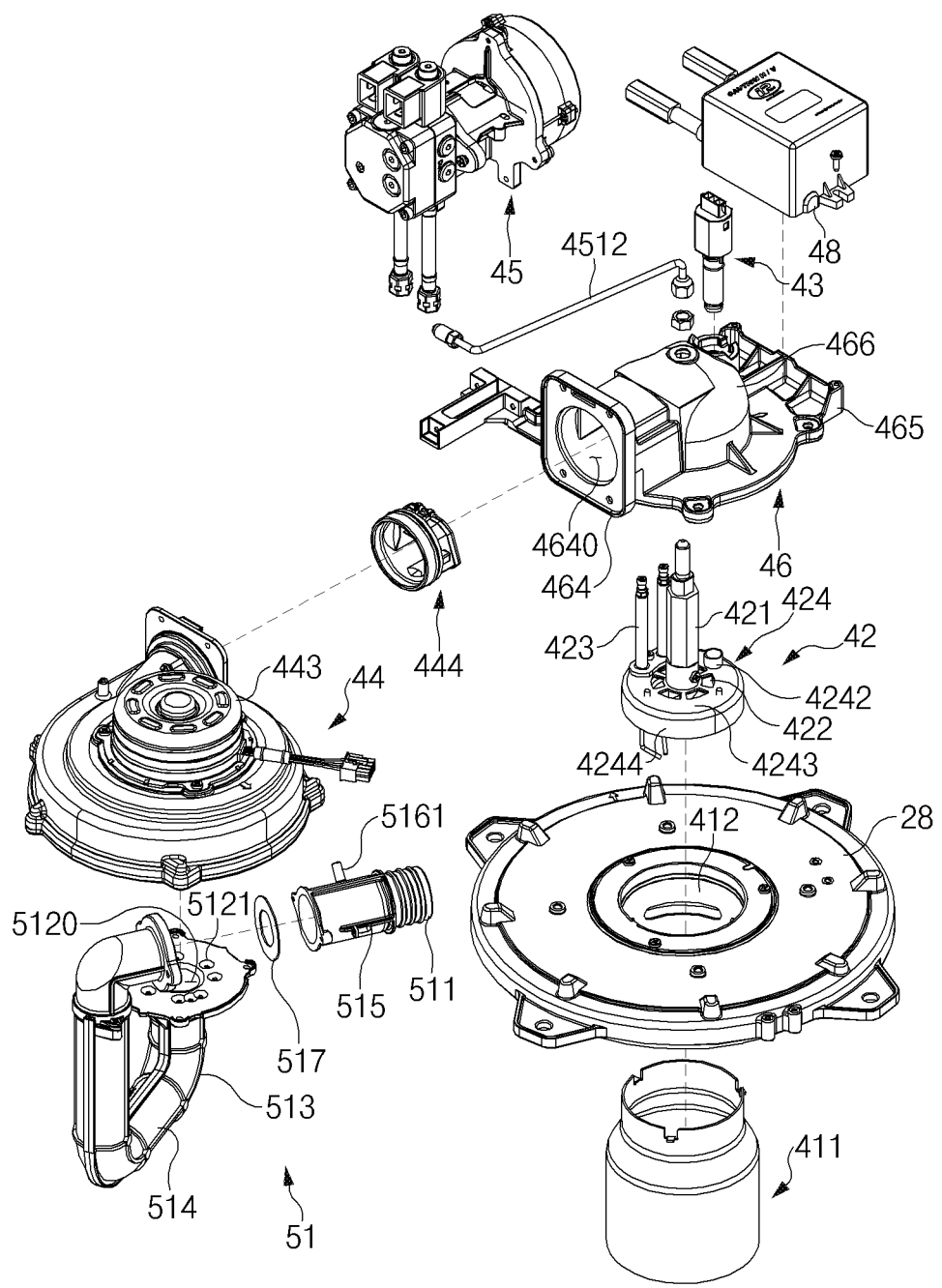
FIG. 9 is an exploded perspective view of a burner assembly of the oil boiler according to an embodiment of the present disclosure.
Figure 10:
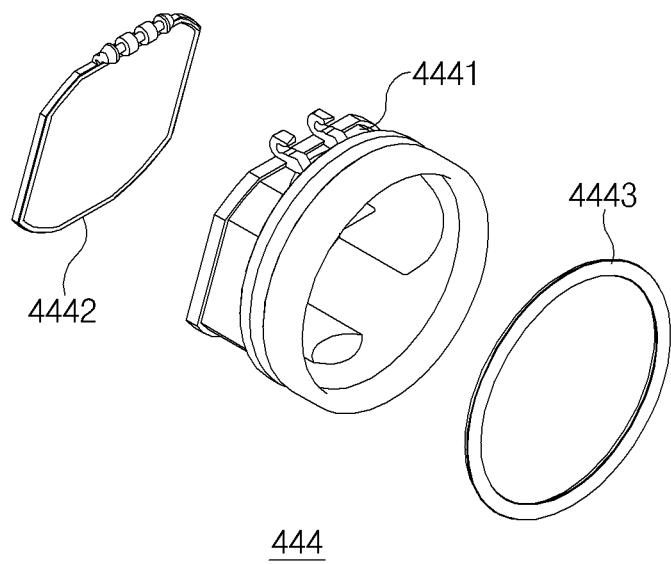
FIG. 10 is an exploded perspective view of a damper of the oil boiler according to an embodiment of the present disclosure.
Figure 11:
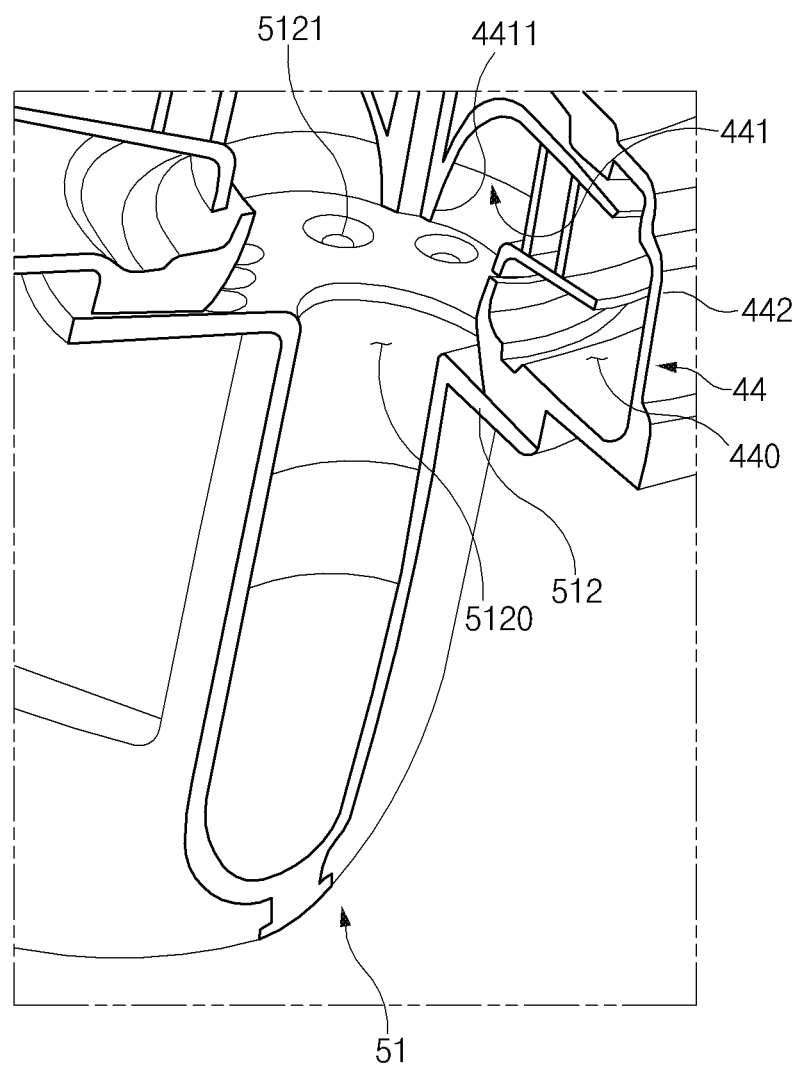
FIG. 11 is a view illustrating an area in which pressure release holes of the oil boiler are located according to an embodiment of the present disclosure.

FIG. 8 is a sectional view of a part blowing air to the burner 42 of the oil boiler 1 according to an embodiment of the present disclosure. FIG. 9 is an exploded perspective view of a burner assembly of the oil boiler 1 according to an embodiment of the present disclosure. FIG. 10 is an exploded perspective view of a damper 444 of the oil boiler 1 according to an embodiment of the present disclosure. FIG. 11 is a view illustrating an area in which pressure release holes 5121 of the oil boiler 1 are located according to an embodiment of the present disclosure.

Additionally referring to FIGS. 8 to 11, the oil boiler 1 according to an embodiment of the present disclosure may include the burner assembly. The burner assembly may include the burner 42, the blower 44, and the fuel pump device 45 and may further include the flame tube part 41, the combustion chamber cover 28, the burner housing 46, the air supply pipe 51, an ignition transformer 48, and a flame acquisition device 43.

The burner assembly may be provided in such a manner that the burner 42 is inserted into and seated in a hole formed in the center of the combustion chamber cover 28 in a state in which the components of the flame tube part 41 are assembled to the combustion chamber cover 28 by fasteners. As the burner assembly is formed in this manner, the components of the oil boiler 1 may be easily disassembled and cleaned.

Blower 44

The oil boiler 1 may further include the blower 44. The blower 44 may be an apparatus for forcibly delivering, to the air nozzle 422, air supplied from the outside. The blower 44 may include the impeller 441 for compressing air and delivering the compressed air to the air nozzle 422, a blower driving motor 443 for transmitting a driving force for rotating the impeller 441 to the impeller 441, and an impeller case 442.

The blower 44 may be connected to the air nozzle 422 through a blower pipe 464. The blower pipe 464 may connect the blower 44 and the burner 42. The damper 444 may be disposed in the blower pipe 464. The damper 444 may include a flap 4442 capable of moving between a first position for opening the blower pipe 464 and a second position for closing the blower pipe 464.

The damper 444 may further include an annular damper body 4441 that is formed in an annular shape and that has a damper opening 4440 in the center thereof. The damper 444 may have a form in which the flap 4442 is coupled to one side of the annular damper body 4441 so as to be rotatable. The annular damper body 4441 may be disposed in a direction oblique to the extension direction of the blower pipe 464, and a lower side of the annular damper body 14441 may protrude toward the flap 4442 such that the flap 4442 has a posture in which the flap 4442 is able to be seated when rotated by the weight thereof. The flap 4442 may rotate to the second position for covering the damper opening 4440 and may close the blower pipe 464. The flap 4442 may rotate to the first position spaced apart from the damper opening 4440 and may open the blower pipe 464.

When the blower 44 operates, the flap 4442 may be located at the first position by being pressed by an air flow generated by the blower 44. When the blower 44 does not operate, the flap 4442 may be located at the second position by the weight of the flap 4442. Accordingly, the flap 4442 may close the blower pipe 464 to prevent a situation in which oil mist left in the fuel nozzle 421 after the oil boiler 1 stops operating flows backward and is located in the air supply pipe 51 and the flue 53 or released to the outside to generate unpleasant smell.

When the annular damper body 4441 is disposed in the blower pipe 464, an O-ring 4443 may be mounted on the annular damper body 4441 to form a seal between the annular damper body 4441 and an inner surface of the blower pipe 464. The O-ring 4443 may be formed of a flexible material.

The impeller 441 may rotate to compress introduced air and blow the compressed air. The impeller 441 may have a special shape. For example, the impeller 441 may have a shape in which a plurality of helical blades are disposed on an outer surface of a body having a conical or frusto-conical shape with a slight slope so as to be spaced apart from each other. However, the shape of the impeller 441 is not limited thereto.

An inlet 4411 of the impeller 441 may be an area corresponding to the vertex of a cone. As the impeller 441 rotates, air introduced through the inlet 4411 may be delivered to an outlet of the impeller 441, which is formed in the radial direction of the impeller 441, through spaces between the blades and may be released in a compressed state.

The impeller 441 may be disposed in a receiving space 440 of the impeller case 442 so as to be directed downward D. However, the shape of the impeller 441 and the arrangement direction thereof are not limited thereto.

The blower driving motor 443 may receive electric power and may be electrically connected to the processor 151 and controlled by the processor 152. The blower driving motor 443 may be connected with the impeller 441 and may transmit a driving force to the impeller 441 to rotate the impeller 441. The blower driving motor 443 may not be a motor capable of rotating the impeller 441 only at one speed, but may be a motor capable of rotating the impeller 441 at various speeds. Specifically, the blower driving motor 443 may be, but is not limited to, a brushless DC (BLCD) motor. As the blower driving motor 443 rotates the impeller 441 at a higher speed, the flow rate of air delivered to the air nozzle 422 by the blower 44 may be increased. A specific example of controlling the blower driving motor 443 by the processor 152 will be described below in detail in relation to the air supply pipe 51.

The impeller case 442 may be a component having an opening that connects the receiving space 440 and an outlet 5120 of the air supply pipe 51. The impeller case 442 may be formed to surround the impeller 441, and thus air may be forcibly delivered well by the impeller 441 without leakage.

The impeller case 442 may have a case opening that connects the outlet 5120 of the air supply pipe 51 and the receiving space 440. The case opening may be formed in an area adjacent to the inlet 4411 of the impeller 441. The air supply pipe 51 may include a pipe having an inlet and an outlet at opposite ends thereof, and a flange 512 may extend outward from one end of the pipe, at which the outlet is formed, to cover the case opening. Accordingly, the flange 512 may be coupled to an area around the case opening of the impeller case 442.

The air supply pipe 51 may have the pressure release holes 5121. The pressure release holes 5121 may be formed through the flange 512 and may connect the inside and the outside of the impeller case 442. The pressure release holes 5121 may be formed along the periphery of the outlet 5120 of the air supply pipe 51 that is the outlet of the pipe. The pressure release holes 5121 may be spaced apart from each other along the periphery of the outlet of the pipe.

The pressure release holes 5121 may be formed to prevent combustion gas and air from flowing backward from the combustion chamber 22 to the air supply pipe 51 by explosion that occurs in a situation such as ignition of fuel. Even though the combustion gas or the air flows backward to the case opening through the impeller 441, the combustion gas or the air may be released to the outside of the impeller case 442 through the pressure release holes 5121. Accordingly, the flow rate of air or combustion gas flowing backward to the air supply pipe 51 may be significantly reduced.

The pressure release holes 5121 may be formed in a funnel shape having a gradually decreasing diameter toward the outside from the inside of the impeller case 442. Accordingly, when air is suctioned into the receiving space 440 from outside the impeller case 442, the flow speed of the air may be rapidly reduced due to the shape of the pressure release holes 5121, and thus noise may be prevented.

Burner Fixing Plate 424 and Burner Housing 46

The burner fixing plate 424 may be formed in the shape of a circular plate, and a portion extending downward D from the periphery of the circular plate may exist. The portion may make contact with an inner side surface of the upper flame tube 412 to maintain air-tightness and allow the upper flame tube 412 and the burner fixing plate 424 to be fixed to each other well.

Specifically, the burner fixing plate 424 may include a circular fixing plate portion 4243 and a peripheral portion 4244 extending downward from the periphery of the fixing plate portion 4243 and making contact with an inner side surface of the flame tube part 41. The peripheral portion 4244 may make contact with the inner side surface of the upper flame tube 412 of the flame tube part 41 and may be disposed such that a lower end of the peripheral portion 4244 is able to be observed from the outside through the recirculation holes 413. That is, the lower end of the peripheral portion 4244 may be located above an intermediate position of the recirculation holes 413 with respect to the vertical direction. Heat transfer to the flame acquisition device 43, which will be described below, may be reduced by minimizing the area by which the peripheral portion 4244 is exposed through the recirculation holes 413.

The areas of the recirculation holes 413 may be adjusted by adjusting the height of the peripheral portion 4244 that blocks parts of the recirculation holes 413. Accordingly, the height of the lower end of the peripheral portion 4244 may be determined such that the recirculation holes 413 have the largest size that can be used in the oil boiler 1 having a corresponding capacity.

The lower end of the peripheral portion 4244 may be located above the recirculation holes 413. Accordingly, the peripheral portion 4244 and the recirculation holes 413 may not overlap each other.

The burner housing 46, together with the burner fixing plate 424, may form the burner space 460 (refer to FIG. 8) that surrounds part of the fuel nozzle 421 and part of the spark plug 423. The blower 44 may blow air into the burner space 460 (refer to FIG. 8), and the burner space 460 (refer to FIG. 8) may be connected to the air nozzle 422 to supply the air into the combustion chamber 22 through the air nozzle 422.

The burner housing 46 may be fixedly seated on an upper surface of the combustion chamber cover 28. However, the entirety of a lower surface of the burner housing 46 that faces the combustion chamber cover 28 may not be brought into contact with the upper surface of the combustion chamber cover 28, and part of the lower surface of the burner housing 46 may be brought into contact with and coupled with part of the upper surface of the combustion chamber cover 28 to form a spacing space between the burner housing 46 and the combustion chamber cover 28.

Specifically, an annular cover contact portion 462 may be formed at a lower end of the burner housing 46 and may be brought into contact with and coupled with the combustion chamber cover 28 by a fastener. Part of the burner housing 46 that is located inward of the cover contact portion 462 in the radial direction may be spaced apart upward from the combustion chamber cover 28 to form the burner space 460.

Due to this structure, heat transferred to the burner housing 46 may be less than heat transferred from the high-temperature combustion chamber 22 to the combustion chamber cover 28 when the burner housing 46 and the entire combustion chamber cover 28 make contact with each other. The degree to which the flame acquisition device 43 is heated may be decreased as the degree to which the burner housing 46 is heated is reduced.

An annular cover packing 461 may be disposed to prevent leakage of combustion gas or air between the burner housing 46 and the combustion chamber cover 28. The cover packing 461 may be disposed between the burner housing 46 and the combustion chamber cover 28 to seal the burner space 460.

Furthermore, part of the burner housing 46 that is located outward of the cover contact portion 462 in the radial direction may include part of the outside of a transformer fixing part 465 and part of the outside of the blower pipe 464. The oil boiler 1 according to an embodiment of the present disclosure may include the ignition transformer 48 that receives general power, raises the voltage of the power, and supplies the power to the spark plug 423 to make a spark. The transformer fixing part 465 may be provided to fix the ignition transformer 48. The blower pipe 464 may be connected with the blower 44 and may serve as a passage for forcibly delivering air into the burner space 460. The part of the outside of the transformer fixing part 465 and the part of the outside of the blower pipe 464 may be spaced apart upward from the combustion chamber cover 28. This is to reduce the amount of heat transferred to the flame acquisition device 43, which will be described below, by decreasing a contact area with the combustion chamber cover 28 heated by a combustion reaction.

Fuel Pump Device 45

Figure 12:
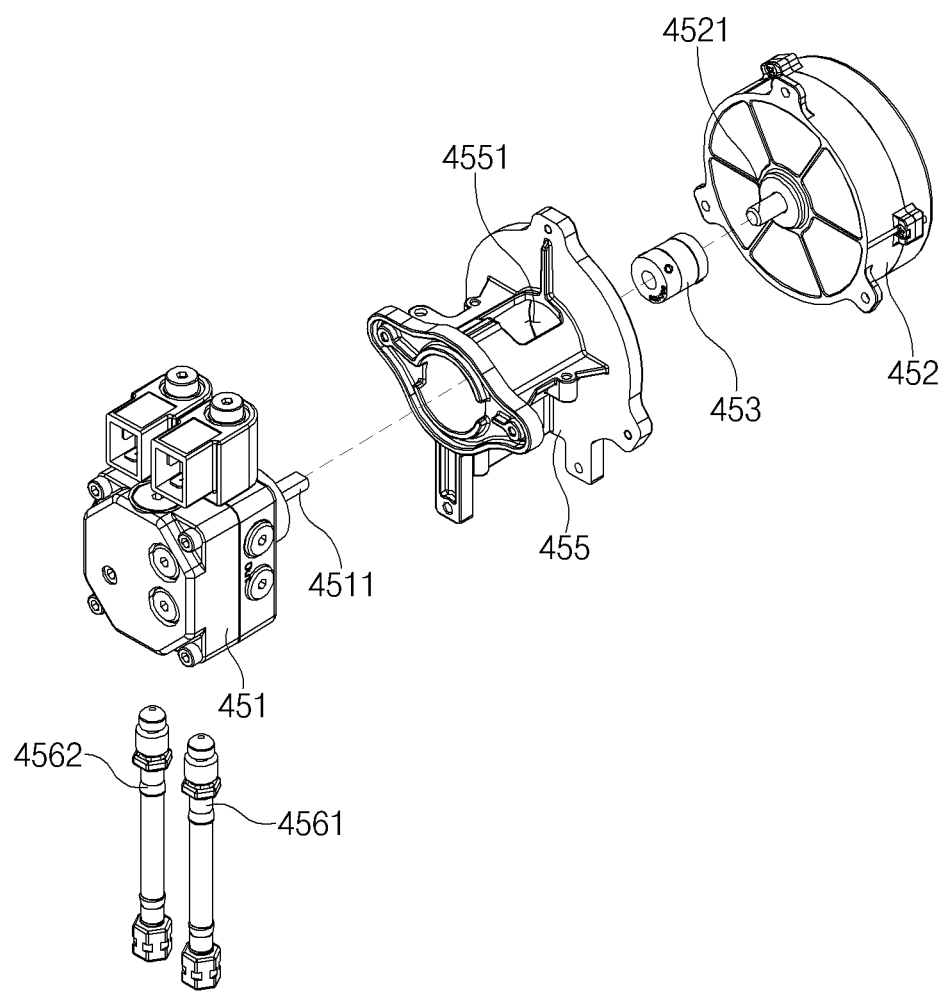
FIG. 12 is an exploded perspective view of a fuel pump device of the oil boiler according to an embodiment of the present disclosure.

FIG. 12 is an exploded perspective view of the fuel pump device 45 of the oil boiler 1 according to an embodiment of the present disclosure.

The fuel pump device 45 according to an embodiment of the present disclosure will be described below with additional reference to FIG. 12. The fuel pump device 45 may be a component for supplying fuel to the fuel nozzle 421. The fuel pump device 45 may include a fuel pump 451 and a fuel pump driving motor 452 and may further include a coupling 453, a fuel pump case 455, and a heat dissipation hole 4551.

The fuel pump 451 may be a component including gears for compressing the fuel and delivering the compressed fuel to the fuel nozzle 421. Accordingly, the fuel pump 451 may be a gear pump in which the gears are engaged with each other to compress fluid between the gears and inject the fluid. The fuel pump 451 may be connected with a fuel pipe 4561, through which the fuel flowing from a fuel storage device (not illustrated) passes, to receive the fuel and may be connected with a recovery pipe 4562 to return the remaining fuel left after injection to the fuel storage device.

The fuel pump driving motor 452 may be a component that transmits a driving force to the fuel pump 451 to rotate the gears. The fuel pump driving motor 452 may be provided separately from the blower driving motor 443. Accordingly, as compared with when the blower 44 and the fuel pump 451 are mounted on the same shaft of the same motor and receive a driving force, the amount of eccentricity may be decreased due to a reduction in the length of a member used as a shaft, driving torque may be reduced, and power consumption may be decreased.

The fuel pump driving motor 452 may be controlled by the processor 152 such that the fuel pump 451 compresses and supplies the fuel to the fuel nozzle 421 at a first fuel flow rate or a second fuel flow rate higher than the first fuel flow rate. Accordingly, the fuel pump 451 may supply the fuel in at least two stages and may supply the fuel to the fuel nozzle 421 at a different fuel flow rate that is not the same as the first fuel flow and the second fuel flow rate, in addition to the first fuel flow rate and the second fuel flow rate described above.

A shaft member 4511 of the fuel pump 451 that is provided to rotate the gears and a driving shaft 4521 of the fuel pump driving motor 452 that is provided to transmit the driving force of the fuel pump driving motor 452 may be connected by the coupling 453.

The coupling 453 may be an Oldham coupling. Accordingly, the driving force of the fuel pump driving motor 452 may be transmitted to the gears of the fuel pump 451 even in an eccentric state in which the shaft member 4511 of the fuel pump 451 and the driving shaft 4521 of the fuel pump driving motor 452 are not mounted on the same shaft. Furthermore, the fuel pump 451 can be driven with a small torque even in the eccentric state.

The fuel pump device 45 may have the fuel pump case 455 having an interior space in which the shaft member 4511 of the fuel pump 451, the coupling 453, and the driving shaft 4521 of the fuel pump driving motor 452 are received. The fuel pump case 455 may have the heat dissipation hole 4551 formed therein. The heat dissipation hole 4551 may be an opening that is formed through the fuel pump case 455 and that connects the interior space and the outside of the fuel pump case 455. The heat dissipation hole 4551, which is open, may dissipate heat generated during coupling. Furthermore, the heat dissipation hole 4551 may be formed in a size to allow for passage of the coupling 453, and the coupling 453 may be assembled to the shaft member 4511 of the fuel pump 451 and the driving shaft 4521 of the fuel pump driving motor 452 through the heat dissipation hole 4551.

The processor 152 may control the fuel pump device 45 to supply the fuel to the fuel nozzle 421 at the first fuel flow rate during ignition of a mixture. As the fuel pump device 45 supplies the fuel to the fuel nozzle 421 at the first fuel flow rate lower than the second fuel flow rate, ignition noise may be reduced, as compared with when the mixture is ignited while the fuel is consistently supplied at the second fuel flow rate.

The oil boiler 1 according to an embodiment of the present disclosure may further include a temperature acquisition device 214 for obtaining the temperature of the combustion chamber 22. The temperature acquisition device 214 may be attached to the outside of a surface of the outer container 21 that is adjacent to the combustion chamber 22 and may indirectly obtain the temperature of the combustion chamber 22. The temperature acquisition device 214 may be implemented with a thermocouple. However, the type of the temperature acquisition device 214 and the position thereof are not limited thereto.

The oil boiler 1 that cannot adjust the fuel flow rate at which the fuel pump device 45 delivers the fuel to the fuel nozzle 421 may be considered. In this case, when the combustion chamber 22 is determined to be overheated, the oil boiler 1 may stop the supply of fuel to stop a combustion reaction such that the combustion chamber 22 is cooled. In a case where the combustion chamber 22 is excessively cooled so that heating by a combustion reaction is required, the fuel pump device 45 may supply the fuel to the fuel nozzle 421 again to ignite the mixture and generate a flame. As this operation is repeated, ignition noise may be consistently generated, and a reverse flow of combustion gas or air by explosion during the ignition may occur.

The processor 152 according to an embodiment of the present disclosure may be electrically connected with the temperature acquisition device 214. This is to allow the processor 152 to appropriately control the fuel pump device 45 depending on the temperature of the combustion chamber 22 to solve the aforementioned problem.

Specifically, when the fuel pump device 45 supplies the fuel to the fuel nozzle 421 at the second fuel flow rate, the combustion chamber 22 may be overheated, and the temperature of the combustion chamber 22 obtained by the temperature acquisition device 214 may exceed a predetermined upper limit. In this case, the processor 152 may control the fuel pump device 45 to supply the fuel to the fuel nozzle 421 at the first fuel flow rate. Accordingly, the combustion chamber 22 may be prevented from being overheated. In addition, the amount of nitrogen oxide generated due to the high temperature may be reduced, and the combustion reaction may not be stopped.

When the fuel pump device 45 supplies the fuel to the fuel nozzle 421 at the first fuel flow rate, the combustion chamber 22 may be cooled, and the temperature of the combustion chamber 22 obtained by the temperature acquisition device 214 may not reach a predetermined lower limit. In this case, the processor 152 may control the fuel pump device 45 to supply the fuel to the fuel nozzle 421 at the second fuel flow rate. Accordingly, a situation in which the combustion chamber 22 is cooled and therefore heating water is not effectively heated may be prevented, and ignition noise and reverse flow that occur in the situation in which the combustion reaction is re-initiated may be prevented.

Air Supply Pipe Part

The air supply pipe part may include the air supply pipe 51 and a corrugated pipe 52. An inlet of the corrugated pipe 52 may be connected to an air supply adaptor 3333 of the flue connecting adaptor 333, and air introduced into the flue connecting adaptor 333 from the flue 53 is supplied to the corrugated pipe 52. An outlet of the corrugated pipe 52 may be connected to an inlet 5110 of the air supply pipe 51 to supply the air to the air supply pipe 51. An inlet part 511 of the air supply pipe 51 that forms the inlet 5110 of the air supply pipe 51 may be inserted into the outlet of the corrugated pipe 52, and therefore the corrugated pipe 52 and the air supply pipe 51 may be coupled together. The outlet 5120 of the air supply pipe 51 may be connected to the opening of the impeller case 442 to supply the air to the blower 44.

That is, the air supply pipe part may include the air supply pipe 51 and the corrugated pipe 52 that are continuous with each other, and an inlet and an outlet of the air supply pipe part may correspond to the inlet of the corrugated pipe 52 and the outlet 5120 of the air supply pipe 51, respectively. The air supply pipe part having the above-described structure may guide external air to the blower 44 to guide the air to the air nozzle 422.

The corrugated pipe 52 may be a tube having a corrugated outer surface in an accordion form and may be variable in overall shape and length. Accordingly, the positions of the inlet and the outlet of the corrugated pipe 52 may be freely determined, and the corrugated pipe 52 may be easily deformed. Even though the position of the air supply pipe 51 or the position of the air supply adaptor 3333 of the flue connecting adaptor 333 is changed, the corrugated pipe 52 may easily connect the flue connecting adaptor 333 and the air supply pipe 51. A flexible material may be selected to be the material of the corrugated pipe 52.

The total length of the air supply pipe 51 may be greater than the length of a straight line that connects the inlet 5110 of the air supply pipe 51 and the outlet 5120 of the air supply pipe 51. That is, the air supply pipe 51 may have bent or curved portions without being formed in a cylindrical pipe shape in which an inlet and an outlet are connected straight.

During ignition of a mixture, the pressure of combustion gas and air that flow back to the blower 44 from the interior space 220 of the combustion chamber 22 by explosion of the mixture may be generated and applied. However, the pressure of air that acts from the blower 44 to the interior space 220 by the blower 44 may also be present. At least one of the total length of the air supply pipe 51 and the inner diameter of the air supply pipe 51 may be determined based on the difference between the two pressures.

Specifically, based on the magnitudes of the two pressures described above, the total length of the air supply pipe 51 may be formed such that the combustion gas or the air that flows backward does not pass through the air supply pipe 51. As the length of the air supply pipe 51 is increased, the magnitude of resistance against the fluid flowing backward may be increased.

Furthermore, based on the magnitudes of the two pressures described above, the inner diameter of the air supply pipe 51 may be formed such that the combustion gas or the air that flows backward does not pass through the air supply pipe 51. As the inner diameter of the air supply pipe 51 is decreased, the magnitude of resistance against the fluid flowing backward may be increased.

For example, the pressure generated in the interior space 220 during ignition may be about 150 mmH$_2$O. The wind pressure of the blower 44 during the ignition may be about 100 mmH$_2$O. Accordingly, the inner diameter and the total length of the air supply pipe 51 may be formed such that the air supply pipe 51 has resistance by which an air flow does not occur even when the difference in pressure between the inlet 5110 and the outlet 5120 of the air supply pipe 51 is equal to 50 mmH$_2$O that corresponds to the difference between the two pressures.

The air supply pipe 51 may include a plurality of linear portions 514 and a plurality of connecting portions 513 so as to have bent or curved portions. The plurality of linear portions 514 may extend straight, and each of the connecting portions 513 may connect two linear portions 514 adjacent to each other such that the two linear portions 514 are perpendicular to each other. As the air supply pipe 51 has at least one connecting portion 513, the air supply pipe 51 may have a bent shape as illustrated. Furthermore, in the limited interior space 220 of the case 10, the air supply pipe 51 may have a long length and may occupy a minimum space. The linear portions 514 and the connecting portions 513 may form the above-described pipe part.

Figure 13:
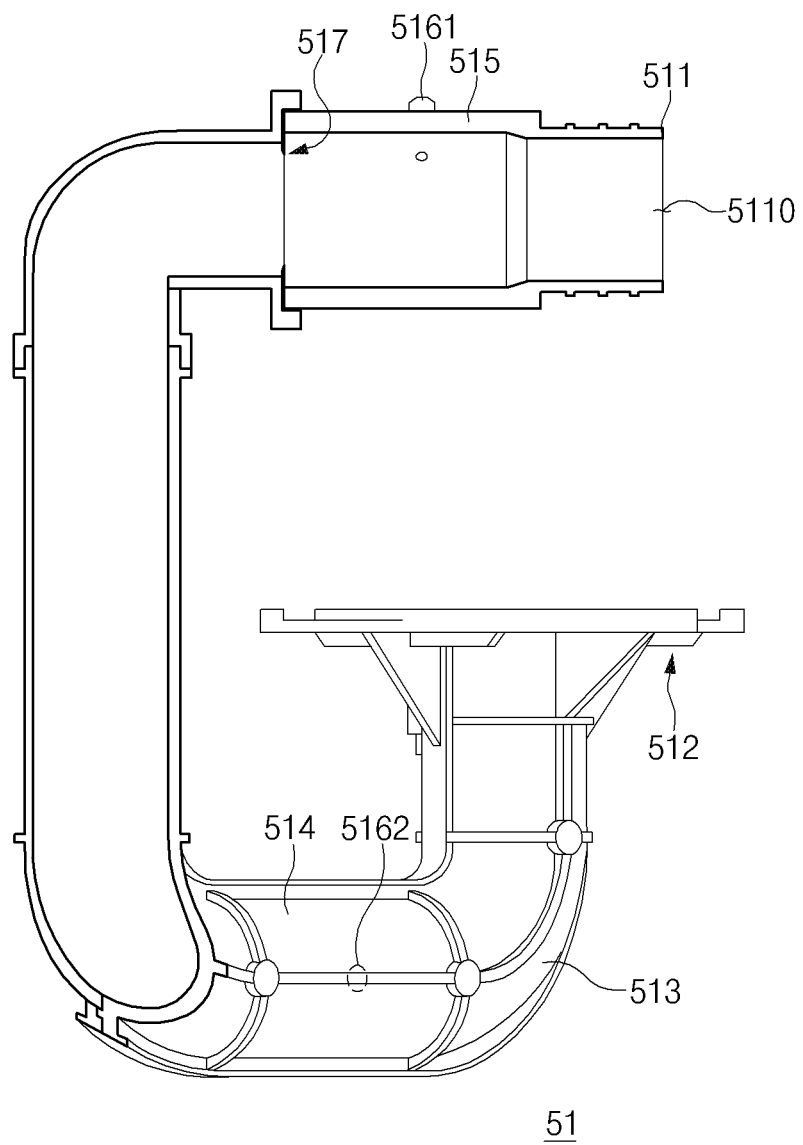
FIG. 13 is a sectional view of an air supply pipe of the oil boiler according to an embodiment of the present disclosure.

FIG. 13 is a sectional view of the air supply pipe 51 of the oil boiler 1 according to an embodiment of the present disclosure. An internal structure of the air supply pipe 51 and control of the blower 44 using the same will be described below with additional reference to FIG. 13. Differential pressure measuring instruments 5161 and 5162 may be disposed at two points of the air supply pipe 51. The differential pressure measuring instrument located at an upstream side along the flow direction of air when the blower 44 operates may be the first differential pressure measuring instrument 5161, and the differential pressure measuring instrument located at a downstream side may be the second differential pressure measuring instrument 5162. The differential pressure acquisition device 47 may be connected to the two differential pressure measuring instruments 5161 and 5162 to obtain a differential pressure between the two differential pressure measuring instruments 5161 and 5162. The differential pressure acquisition device 47 may be a device for obtaining a differential pressure between the two points using a diaphragm. However, the method is not limited thereto.

An orifice plate 157 may be disposed between the two points. The orifice plate 517 may be a structure that causes a pressure drop of an air flow and generates a differential pressure between the two points, in which the pressure measured by the second differential pressure measuring instrument 5162 is lower than the pressure measured by the first differential pressure measuring instrument 5161. Specifically, the orifice plate 517 may be implemented with a plate having, in the center thereof, a hole having a gradually decreasing cross-section along an air flow direction and may cause a pressure drop when air flows.

An adaptor 515 may be disposed upstream of the orifice plate 517 with respect to the flow direction of air. The adaptor 515 may include the inlet 5110 of the air supply pipe 51 and may have, in a position adjacent to the orifice plate 517, an inner diameter larger than the inner diameter of a pipe disposed downstream of the orifice plate 517. However, in the other positions, the adaptor 515 may have an inner diameter smaller or larger than the above-described inner diameter depending on the capacity of the oil boiler 1. The adaptor 515 may be removably coupled with the pipe located downstream of the orifice plate 517 with respect to the orifice plate 517.

The differential pressure acquisition device 47 may be electrically connected with the processor 152 and may transfer an obtained differential pressure to the processor 152. The processor 152 may control the blower 44, based on the obtained differential pressure. The impeller 441 of the blower 44 may rotate at one of a plurality of different speeds.

At a reference differential pressure that is a predetermined appropriate differential pressure, air may be smoothly supplied to the burner 42 to cause a combustion reaction in a state in which the oil boiler 1 normally operates. However, when condensate is not smoothly drained or resistance to the flow of combustion gas is generated by soot accumulated in a passage of the combustion gas, even though the blower 44 identically operates, the flow rate of air supplied to the burner 42 may be decreased, and the pressure of the second differential pressure measuring instrument 5162 may be increased. In this case, the pressure measured by the first differential pressure measuring instrument 5161 may be the same, and therefore the differential pressure may be lower than the reference differential pressure.

The oil boiler 1 in which the blower 44 rotates at the same speed may be considered. In the oil boiler 1, the blower 44 may not be controlled depending on a change in differential pressure, and therefore no countermeasure may be present even when an impediment to the flow of combustion gas occurs. Accordingly, the flow rate of air supplied to the burner 42 may be gradually decreased, and a flame may be finally extinguished so that the boiler may stop operating.

However, the processor 152 of the oil boiler 1 according to an embodiment of the present disclosure may control the blower 44 to maintain the reference differential pressure. When an obtained differential pressure is lower than the reference differential pressure, the processor 152 may control the blower 44 to increase the rotating speed of the impeller 441. Accordingly, the decreasing differential pressure may reach the reference differential pressure again, and the decreasing air flow rate may be increased again so that a state in which a uniform and smooth combustion reaction occurs in the burner 42 may be maintained.

Even though resistance in the path along which combustion gas flows disappears for some reason and the impeller 441 of the blower 44 rotates at the same speed, an air flow rate may be increased, and an obtained differential pressure may exceed the reference differential pressure. In this case, the processor 152 may control the blower 44 to reduce the rotating speed of the impeller 441. Accordingly, the increasing differential pressure may reach the reference differential pressure again, and the increasing air flow rate may be decreased again so that a state in which a uniform and smooth combustion reaction occurs in the burner 42 may be maintained.

Trap Device 32

Figure 14:
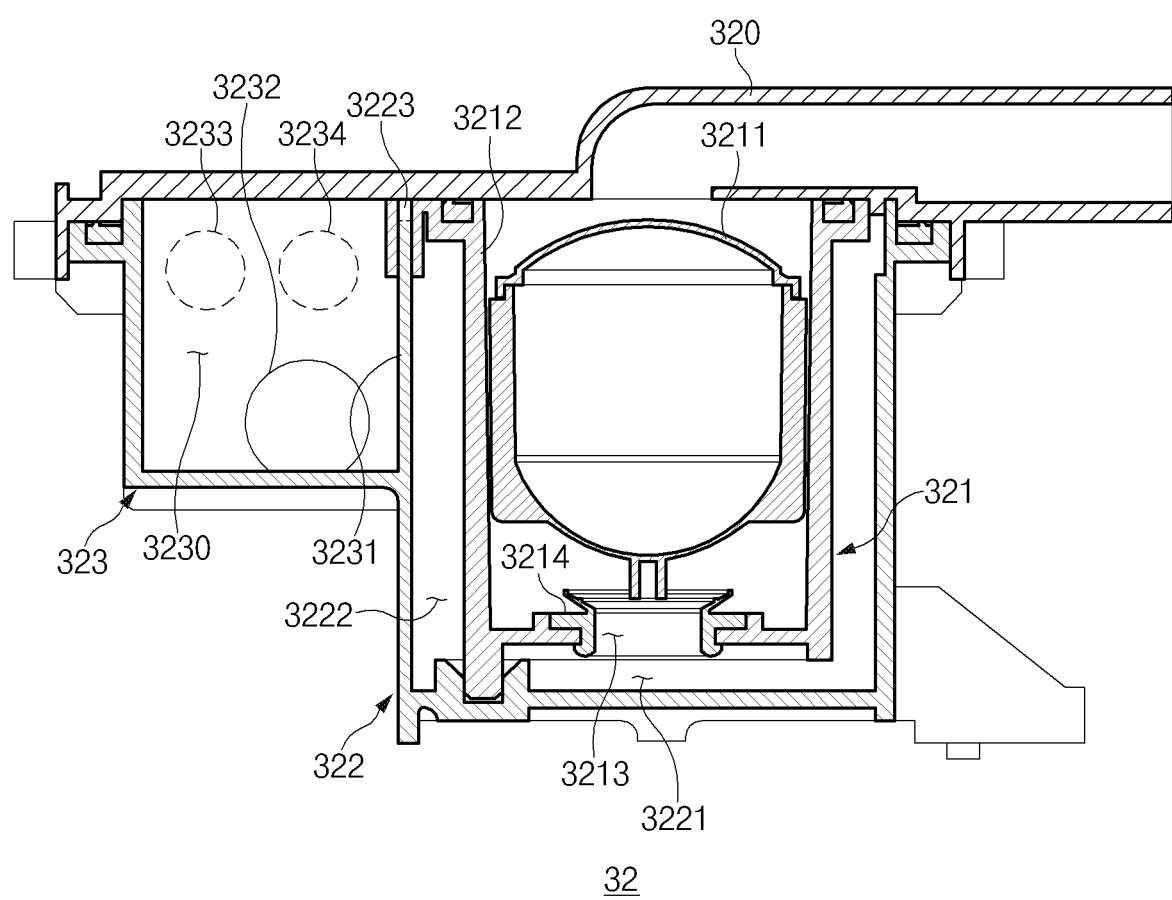
FIG. 14 is a sectional view of a trap device of the oil boiler according to an embodiment of the present disclosure.

FIG. 14 is a sectional view of the trap device 32 of the oil boiler 1 according to an embodiment of the present disclosure. The trap device 32 of the oil boiler 1 according to an embodiment of the present disclosure will be described below with reference to FIG. 14.

The trap device 32 may be a component through which condensate drained through the condensate pipe 341, which is connected to the separator 312 included in the condensate receiver 31, passes. The condensate may be drained to the outside through the trap device 32. However, combustion gas cannot be released like the condensate and may be released through only the duct 33 and the flue 53.

The trap device 32 may include a buoyant body trap 321 and a U-shaped trap 322. The buoyant body trap 321 may include a storage tank 3212 having a space in which water is stored and a buoyant body 3211 disposed in the storage tank 3212. A condensate inflow part 320 connected with the condensate pipe 341 may be connected to the top of the storage tank 3212 to deliver the condensate to the storage tank 3212.

The buoyant body 3211 may be floated or sunk by water stored in the buoyant body trap 321. Here, the stored water may be condensate or separate water stored for initial boiler operation. An intermediate drain hole 3213 may be formed through the bottom of the storage tank 3212, and a seating part 3214 may be formed along the periphery of the intermediate drain hole 3213. The buoyant body 3211 may be seated on the seating part 3214 or may be separated from the seating part 3214. When the buoyant body 3211 is floated by the stored water, the buoyant body 3211 may be separated from the seating part 3214 to open the intermediate drain hole 3213, and the stored water may be drained. When the stored water is drained so that the buoyant body 3211 is sunk, the buoyant body 3211 may be seated on the seating part 3214 to close the intermediate drain hole 3213. The condensate may be drained through the intermediate drain hole 3213 in this way. However, the buoyant body trap 321 may operate so as not to release combustion gas.

The U-shaped trap 322 may be a trap including a first outflow space 3221 and a second outflow space 3222. The U-shaped trap 322 may have a structure that acts as a trap in which the water drained from the buoyant body trap 321 is stored to prevent combustion gas from escaping. The first outflow space 3221 may be a space disposed below the intermediate drain hole 3213 of the buoyant body trap 321 to store the water drained downward D from the buoyant body trap 321. The second outflow space 3222 may be a space extending upward from the first outflow space 3221. When the volume of the water stored in the first outflow space 3221 is greater than the volume of the first outflow space 3221, the water may start to fill the second outflow space 3222. The second outflow space 3222 may extend upward from the first outflow space 3221 and may be formed to surround the storage tank 3212. The second outflow space 3222 may form a U-shaped trap together with the first outflow space 3221.

Part of a trap inner wall 3231 that defines the second outflow space 3222 may have a smaller height than the other parts and may have a condensate passage 3223 like an opening. When the water level reaches the height of the condensate passage 3323 while the water fills the second outflow space 3222, the water may be drained to an outflow container 323 through the condensate passage 3223.

The outflow container 323 may be a container in which the water drained from the second outflow space 3222 is stored and from which the water is drained. An external drain hole 3232 connected with a final drain pipe 340 may be formed in the outflow container 323 to drain the stored water to the outside of the oil boiler 1 through the final drain pipe 340 extending to the outside of the case 10. That is, the condensate supplied from the condensate receiver 31 may be delivered to the outflow container 323 through each trap and may be drained to the outside through the external drain hole 3232 and the final drain pipe 340. A material for performing appropriate treatment on the acidic condensate may be disposed in a drain space 3230 that is an interior space defined by the outflow space 323.

The outflow container 323 may have a drain opening 3233 and a safety opening 3234 formed therein. A drain valve 343 and a safety valve 342 may be connected to the drain opening 3233 and the safety opening 3234 through a drain line 3431 (refer to FIG. 3) and a safety line 3421 (refer to FIG. 3), respectively. The drain valve 343 may be connected to a lower side of the empty space 210 and may be formed to be opened or closed to drain heating water received in the empty space 210 to move, repair, or clean the oil boiler 1. The safety valve 342 may be a valve for lessening excessively high pressure of the heating water received in the empty space 210. The safety valve 342 may be formed to be opened or closed. The safety valve 342 may drain the heating water to decrease the pressure in the empty space 210. The safety valve 342 may remain closed and may be automatically opened when the pressure of the heating water in the empty space 210 reaches a predetermined pressure.

The drain valve 343 and the safety valve 342 may remain closed such that the heating water received in the empty space 210 is not drained from the empty space 210, and may be automatically opened to drain the heating water to the outside of the oil boiler 1 when a user opens the valves or a predetermined condition is satisfied. As the drain valve 343 and the safety valve 342 are connected to the outflow container 323 of the condensate trap in an embodiment of the present disclosure, the heating water may be delivered to the outflow container 323 without being directly drained from the valves to the outside. According to an embodiment of the present disclosure, as only one final drain pipe 340 for draining water to the outside of the case 10 is present, heat insulation and wall-perforating work that have to be performed for each pipe may be reduced, and thus the oil boiler 1 may be easily installed, as compared with when each valve and each trap have a pipe extending to the outside of the case 10 to drain water to the outside.

Connection Form of Flue 53

Figure 15:
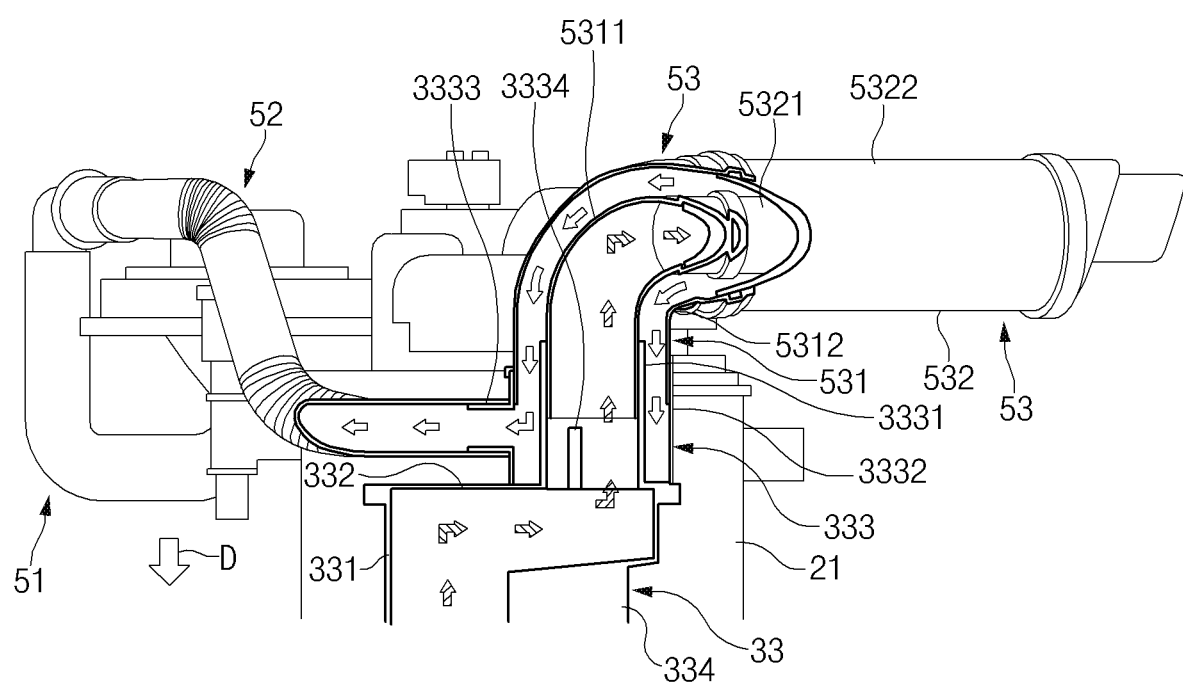
FIG. 15 is a sectional view illustrating a coupling structure of a flue connecting adaptor and a flue of the oil boiler according to an embodiment of the present disclosure.

FIG. 15 is a sectional view illustrating a coupling structure of the flue connecting adaptor 333 and the flue 53 of the oil boiler 1 according to an embodiment of the present disclosure.

The coupling structure of the flue connecting adaptor 333 and the flue 53 will be described below with additional reference to FIG. 15. The flue 53 may be a structure for finally guiding combustion gas to the outside of the case 10 of the oil boiler 1. Accordingly, the flue 53 may be installed to pass through the case 10. The flue 53 may be connected to the flue connecting adaptor 333 of the duct 33.

The flue 53 coupled to the oil boiler 1 of the present disclosure may have a double pipe structure having inner pipes 5311 and 5321 and outer pipes 5312 and 5322 surrounding the inner pipes 5311 and 5321. That is, the diameters of the outer pipes 5312 and 5322 may be greater than the diameters of the inner pipes 5311 and 5321, and the inner pipes 5311 and 5321 and the outer pipes 5312 and 5322 may form concentric circles on a horizontal plane. Accordingly, a first intervening space may be formed between the outer pipes 5312 and 5322 and the inner pipes 5311 and 5321. Air may be guided through the first intervening space.

Furthermore, the flue 53 may include a straight pipe 532 extending straight and may further include an elbow 531 having an inlet and an outlet, the directions of which are perpendicular to each other. The straight pipe 532 and the elbow 531 may constitute the flue 53 and may have a double pipe structure as described above. That is, the inner pipe 5321 and the outer pipe 5322 of the straight pipe 532 may be disposed, and the inner pipe 5311 and the outer pipe 5312 of the elbow 531 that are connected to the inner pipe 5321 and the outer pipe 5322 of the straight pipe 532 may be disposed.

The flue connecting adaptor 333 may have a double pipe structure including an inner adaptor 3331 and an outer adaptor 3332 so as to be connected with the flue 53 having a double pipe structure. The inner adaptor 3331 may be connected with the inner pipes 5311 and 5321, and the outer adaptor 3332 may be connected with the outer pipes 5312 and 5322. The diameter of the outer adaptor 3332 may be greater than the diameter of the inner adaptor 3331, and the inner adaptor 3331 and the outer adaptor 3332 may form concentric circles on a horizontal plane. The outer adaptor 3332 may surround the inner adaptor 3331. Accordingly, a second intervening space may be formed between the outer adaptor 3332 and the inner adaptor 3331.

The tubular inner adaptor 3331 may be formed to supply combustion gas to the inner pipes 5311 and 5321 through the inner pipes 5311 and 5321 and the horizontal duct portion 332. In an embodiment of the present disclosure, the elbow 531 is expressed as being connected to the flue connecting adaptor 333. However, the straight pipe 532 may be connected to the flue connecting adaptor 333.

When the flue 53 is coupled to the flue connecting adaptor 333, the second intervening space between an inner surface of the outer adaptor 3332 and an outer surface of the inner adaptor 3331 may be connected to the first intervening space between inner surfaces of the outer pipes 5312 and 5322 and outer surfaces of the inner pipes 5311 and 5321. Accordingly, external air delivered from the outside of the case 10 may reach the second intervening space through the first intervening space. The outer adaptor 3332 may be connected with the air supply adaptor 3333 connected with the air supply pipe part and may supply the external air to the air supply pipe part through the air supply adaptor 3333. Due to this structure, a structure for air supply from the outside needs not to be provided separately from the flue 53. Furthermore, even though a flue is connected to the flue connecting adaptor 333 in any direction as illustrated in FIGS. 16A to 16D, air supply for the air supply pipe part may always be possible at a predetermined position in the case 10, and therefore the flow rate of air supplied may not be affected.

The air supply adaptor 3333 included in the flue connecting adaptor 333 may protrude outward from the external adaptor 3332 in the radial direction. The outer adaptor 3332 and the inner adaptor 3331 may be open upward and may be connected to the elbow 531 of the flue 531 along the vertical direction. The outer adaptor 3332 and the inner adaptor 3331 may be open downward and may be connected to the horizontal duct portion 332 in the vertical direction. Accordingly, the air supply adaptor 3333 may extend in one of the horizontal directions and may be connected to the corrugated pipe 52 along the extension direction.

The space between the inner surface of the outer adaptor 3332 and the outer surface of the inner adaptor 3331 may be connected to the inside of the air supply adaptor 3333. The corrugated pipe 52 connected to the inlet part 511 of the air supply pipe 51 may be connected to the air supply adaptor 3333.

The flue 53 may be inserted into and coupled with the flue connecting adaptor 333. The outer diameters of the inner pipes 5311 and 5321 may be equal to or smaller than the inner diameter of the inner adaptor 3331, and therefore the inner pipes 5311 and 5321 may be inserted into the inner adaptor 3331. Likewise, the outer diameters of the outer pipes 5312 and 5322 may be equal to or smaller than the inner diameter of the outer adaptor 3332, and therefore the outer pipes 5312 and 5322 may be inserted into the outer adaptor 3332.

The flue connecting adaptor 333 may further include a stopper 3334 inside. When the flue 53 is inserted too deep into the flue connecting adaptor 333, the outer pipes 5312 and 5322 may block the inlet of the air supply adaptor 3333 connected to the outer adaptor 3332. The stopper 3334 may protrude inward from an inner surface of the inner adaptor 3331 in the radial direction. The inner pipes 5311 and 5321 may be stopped by the stopper 3334 while being inserted downward D, and therefore the flue 53 may no longer be inserted downward D. That is, when the flue 53 is inserted into and coupled to the flue connecting adaptor 333, the stopper 3334 may suppress a movement of the inner pipes 5311 and 5321 to a lower position than a predetermined point to prevent the outer pipes 5312 and 5322 from blocking the opening formed in the outer adaptor 3332.

The height of the stopper 3334 may be a height by which when the inner pipes 5311 and 5321 make contact with the stopper 3334, the outer pipes 5312 and 5322 are located in a higher position than the inlet of the air supply adaptor 3333 so as not to block the air supply adaptor 3333. A plurality of stoppers 3334 may be disposed to be spaced apart from each other along the inner surface of the inner adaptor 3331. On a horizontal plane, the outer diameters of the inner pipes 5311 and 5321 may be smaller than the inner diameters of the inner adaptor 3331, but may be greater than the distance from the center of the inner adaptor 3331 to the stopper 3334.

FIGS. 16A to 16D are perspective views illustrating various forms in which the flue 53 is connected to the oil boiler 1 according to an embodiment of the present disclosure.

The outlet of the duct 33 may be disposed in a position spaced apart from the upper wall 11 of the case 10 at more than a safety interval that is a predetermined interval. The safety interval may be a predetermined interval greater than the outer diameter of the pipe that constitutes the straight pipe 532 and the elbow 531 of the flue 53. Accordingly, the straight pipe 532 or the elbow 531 may be disposed between the duct 33 and the upper wall 11 of the case 10.

Flue insertion holes 111, 1211, 1231, and 1241 may be formed in the upper wall 11 and the sidewalls 12 that constitute the case 10. The flue insertion holes 111, 1211, 1231, and 1241 may be openings through which the flue 53 passes. When the case 10 has the four sidewalls 12, the flue insertion holes 111, 1211, 1231, and 1241 may be formed in the upper wall 11 and at least two of the four sidewalls 12. In an embodiment of the present disclosure, the flue insertion holes 111, 1211, 1231, and 1241 are expressed as being formed in the upper wall 11, the first sidewall 121, the third sidewall 123, and the fourth sidewall 124, respectively. However, the positions in which the flue insertion holes 111, 1211, 1231, and 1241 are formed are not limited thereto.

When the flue 53 is inserted into the flue insertion hole 1121, 1231, or 1241 formed in the sidewall 121, 123, or 124, the flue 53 may include the elbow 531 coupled with the flue connecting adaptor 333 and the straight pipe 532 facing toward the flue insertion hole 1121, 1231, or 1241 of the corresponding sidewall 121, 123, or 124 from the elbow 531 along a horizontal direction. When the flue 53 is inserted into the flue insertion hole 111 formed in the upper wall 11, the flue 53 may include the straight pipe 532, and the straight pipe 532 may be directly coupled with the flue connecting adaptor 333.

Figure 16A:
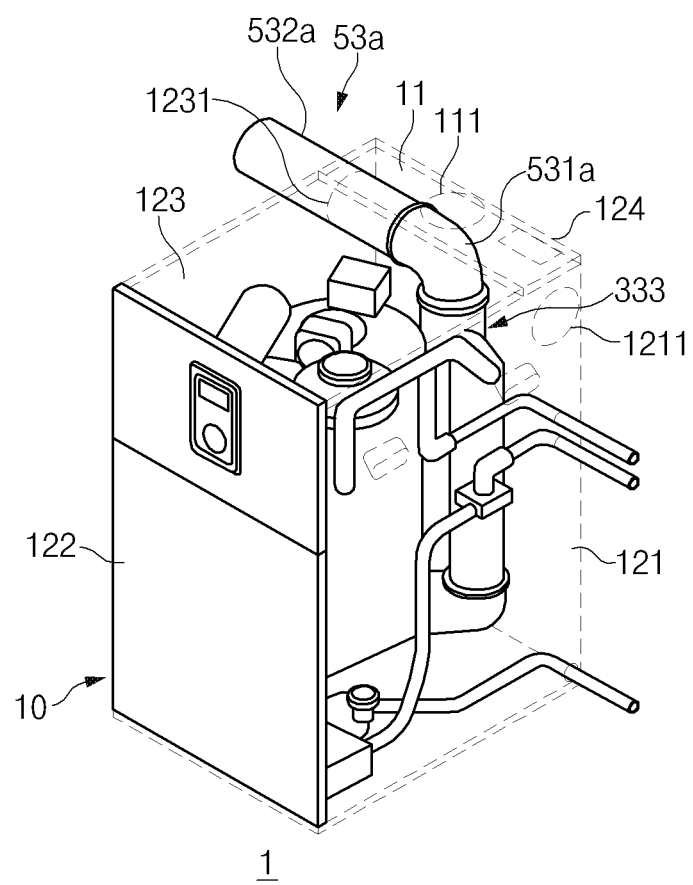
FIGS. 16A to 16D are perspective views illustrating various forms in which the flue is connected to the oil boiler according to an embodiment of the present disclosure.
Figure 16B:
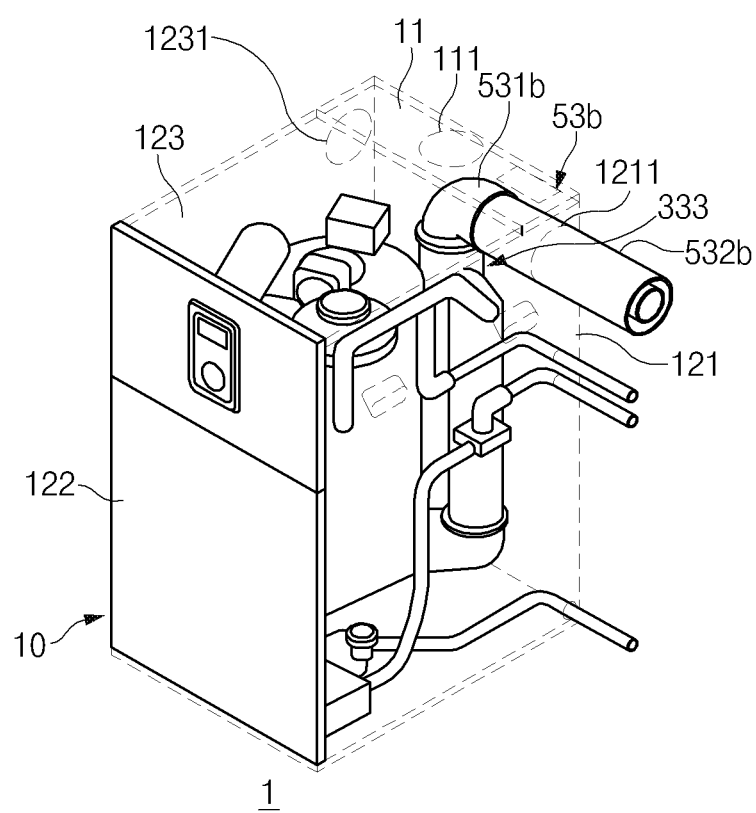
Figure 16C:
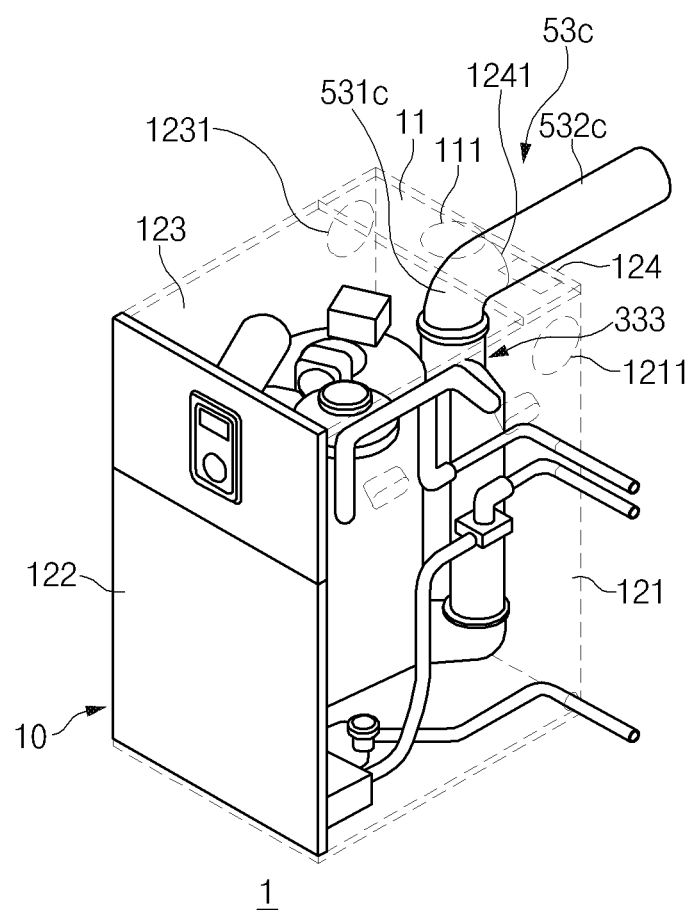
Figure 16D:
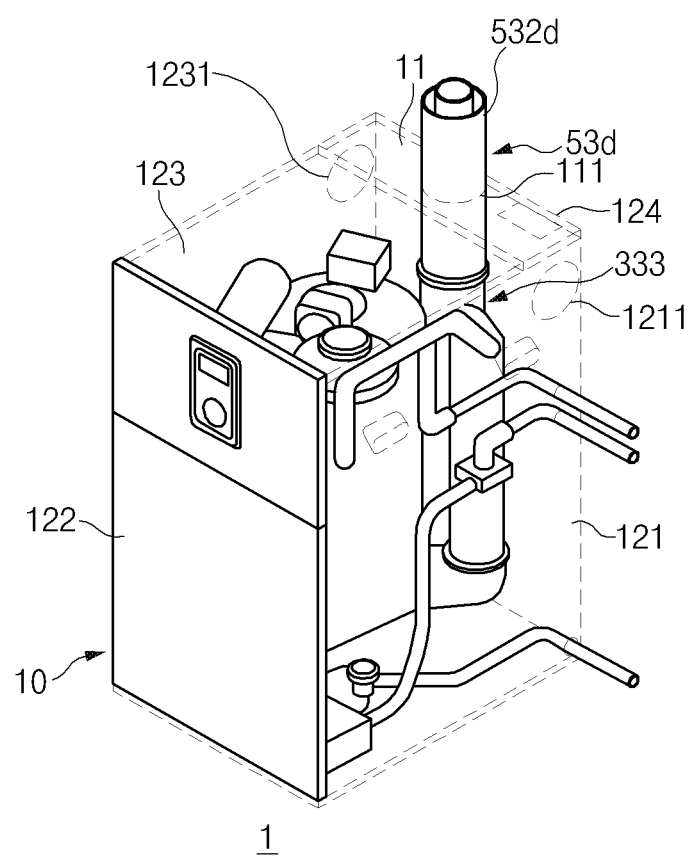

FIG. 16A illustrates a situation in which a flue 53a including a straight pipe 532a and an elbow 531a is inserted into the flue insertion hole 1231 formed in the third sidewall 123, FIG. 16B illustrates a situation in which a flue 53b including a straight pipe 532b and an elbow 531b is inserted into the flue insertion hole 1211 formed in the first sidewall 121, FIG. 16C illustrates a situation in which a flue 53c including a straight pipe 532c and an elbow 531c is inserted into the flue insertion hole 1241 formed in the fourth sidewall 124, and FIG. 16D illustrates a situation in which a flue 53 including a straight pipe 532d is inserted into the flue insertion hole 111 formed in the upper wall 11. In the drawings, the remaining walls other than the second sidewall 122 constituting the case 10 are shown by dotted lines such that the connecting state of the flue 53 and the flue connecting adaptor 333 is more easily recognized.

The elbow 531 connected to the flue connecting adaptor 333 may be connected, through the straight pipe 532, with one of the plurality of flue insertion holes 1211, 1231, and 1241 formed in the sidewalls 12. In this state, the elbow 531 may be connected with another one of the flue insertion holes 1211, 1231, and 1241 through the straight pipe 532 by rotating while maintaining the coupling with the flue connecting adaptor 333.

For example, as illustrated in FIG. 16A, the elbow 531a may be disposed to face the third sidewall 123 in the state of being connected to the flue connecting adaptor 333. In this state, the elbow 531a may be connected to the flue insertion hole 1231, which is formed in the third sidewall 123, through the straight pipe 532a.

In this state, as illustrated in FIG. 16B, the elbow 531b may be disposed to face the first sidewall 121 by rotating the elbow 531a while the coupling with the flue connecting adaptor 333 is maintained. In the state of FIG. 16B, the elbow 531b may be connected to the flue insertion hole 1211, which is formed in the first sidewall 121, through the straight pipe 532b.

As described above, when the flue connecting adaptor 333 according to an embodiment of the present disclosure is used, the flue 53 may be inserted into the flue insertion hole 1211, 1231, or 1241 formed in each of the sidewalls 12 by rotating the flue 53 about the axis facing the vertical direction while the connection of the flue connecting adaptor 333 and the flue 53 is maintained. Accordingly, even when there is a limitation in the direction in which the flue 53 is provided in a space in which the oil boiler 1 is installed, the flue 53 may be provided and connected to the oil boiler 1 in a possible direction.

As the flue connecting adaptor 333 does not move or rotate in the process of changing the connection position of the flue 53, the position of the air supply adaptor 3333 where the corrugated pipe 52 of the air supply pipe part is connected with the duct 33 is not changed. Accordingly, deformation of the air supply pipe part may be prevented, and thus air may be stably supplied to the air supply pipe part.

Flame Acquisition Device 43

Figure 17:
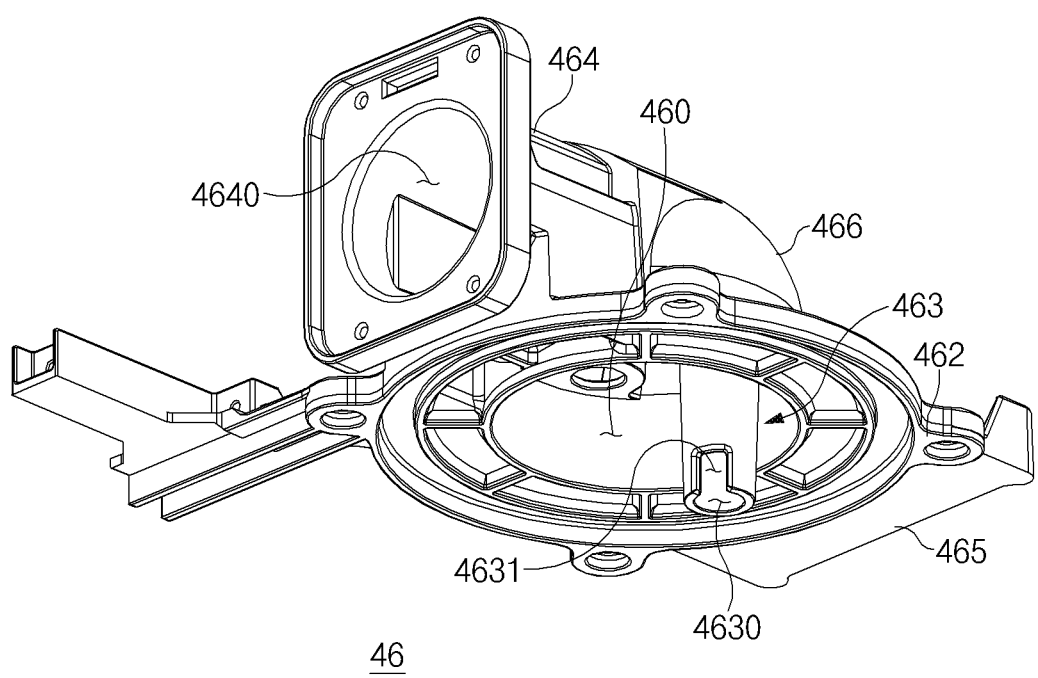
FIG. 17 is a perspective view of a burner housing of the oil boiler according to an embodiment of the present disclosure.

The oil boiler 1 according to an embodiment of the present disclosure may further include the flame acquisition device 43. FIG. 17 is a perspective view of the burner housing 46 of the oil boiler 1 according to an embodiment of the present disclosure. Referring to FIGS. 8, 9, and 17, the burner housing 46 may include a sensor hole forming part 463. A sensor hole 4630 may be defined, and the flame acquisition device 43 may be inserted into the sensor hole 4630.

The flame acquisition device 43 may be a component that obtains features such as temperature from a flame. The flame acquisition device 43 may be a UV sensor that receives ultraviolet light generated from a flame located in the combustion chamber 22 and generates a measurement signal. The flame acquisition device 43 may be electrically connected with the processor 152 and may transfer the generated measurement signal to the processor 152 such that the processor 152 uses the measurement signal for computation. A presence or absence of a flame in the interior space 220 may be determined by the flame acquisition device 43, and therefore whether a combustion reaction occurs may be determined.

The flame acquisition device 43 may be sensitive to temperature. Accordingly, when high-temperature heat generated in the combustion chamber 22 is easily transferred to the flame acquisition device 43, the flame acquisition device 43 may fail to perform a function thereof.

The flame acquisition device 43 has to be able to identify a flame generated in the interior space 220 of the combustion chamber 22. Accordingly, the flame acquisition device 43 may be disposed in a position where the interior space 220 of the combustion chamber 22 is visible through a flame monitoring hole 4241 that is an opening formed in the burner fixing plate 424. In an embodiment of the present disclosure, the flame monitoring hole 4241 may be formed to be open in the vertical direction, and the flame acquisition device 43 may be inserted into the sensor hole 4630 formed in the vertical direction. Accordingly, the sensor hole 4630 may be connected to the interior space 220 through the flame monitoring hole 4241, and a flame directed downward D may be identified through the flame monitoring hole 4241.

Specifically, the fixing plate portion 4243 of the burner fixing plate 424 may include a first surface exposed to the interior space 220 and a second surface opposite to the first surface. The flame monitoring hole 4241 may be formed through the fixing plate portion 4241 from the first surface to the second surface. The flame acquisition device 43 may be installed to be spaced apart upward from the second surface.

The sensor hole 4630 may be defined by being surrounded by the sensor hole forming part 463 that is part of the burner housing 46. The sensor hole 4630 may be connected to the outside such that the flame acquisition device 43 is inserted into the sensor hole 4630 from the outside. Specifically, to form the burner space 460 between the burner housing 460 and the burner fixing plate 424, the burner housing 46 may have a housing upper wall 466 spaced apart upward from the burner fixing plate 424. The sensor hole forming part 463 may have a tubular shape extending downward from the housing upper wall 466. The sensor hole 4630 may be defined in an empty space of the sensor hole forming part 463.

The sensor hole forming part 463 may include a cooling hole 4631 that is partly open to connect the sensor hole 4630 and the burner space 460. The cooling hole 4631 may allow for introduction of air to perform air cooling on the sensor hole forming part 463 and the flame acquisition device 43. The cooling hole 4631 may be open toward the fuel nozzle 421.

The sensor hole 4630 may be disposed on the opposite side to the blower 44 with respect to the fuel nozzle 421 to minimize an influence on the burner space 460 and the blower 44 by combustion gas or air in the combustion chamber 22 that flows backward through the sensor hole 4630. Specifically, the blower 44 and the burner housing 46 may be connected with each other, and air may be introduced from the blower 44 into the burner space 460 through an air inlet 4640. The cooling hole 4631 may be located on the opposite side to the air inlet 4640 with respect to the fuel nozzle 421. A lower end of the flame acquisition device 43 inserted into the sensor hole 4630 may be spaced apart upward from an upper end of the cooling hole 4631, and the flame acquisition device 43 may be located above the cooling hole 4631.

To minimize the amount of fluid introduced into the sensor hole 4630 through the flame monitoring hole 4241, the diameter of the flame monitoring hole 4241 may be smaller than the inner diameter of a flame monitoring pipe 4242 that has a tubular shape and that is disposed above the flame monitoring hole 4241. To reduce the amount of air introduced into the flame monitoring hole 4241 through the cooling hole 4631, the flame monitoring pipe 4242 may surround the flame monitoring hole 4241 and may protrude upward from the burner fixing plate 424. That is, the flame monitoring pipe 4242 may surround the flame monitoring hole 4241 and may protrude toward the sensor hole 4630 from the second surface. As the flame monitoring pipe 4242 is disposed, less nitrogen oxide may be generated, as compared with when the flame monitoring pipe 4242 is not disposed.

The cross-section of the flame monitoring hole 4241 on a horizontal plane may be 14% to 22% of the cross-section of a hole defined inside the flame monitoring pipe 4242 by the flame monitoring pipe 4242. When the cross-section of the flame monitoring hole 4241 exceeds the upper limit, an excessive amount of air may flow through the flame monitoring hole 4241. Accordingly, recirculation of combustion gas may be disadvantageous, and nitrogen oxide may be increased. When the cross-section of the flame monitoring hole 4241 is smaller than the lower limit, it may be impossible to observe a flame of the flame acquisition device 43 through the flame monitoring hole 4241.

Upper part of the flame monitoring pipe 4242 may be inserted into the sensor hole 4630, and the length by which the flame monitoring pipe 4242 overlaps the sensor hole forming part 463 in the vertical direction may be smaller than 50% of the length of the flame monitoring pipe 4242 in the vertical direction. This is to reduce the degree to which heat transferred upward from the combustion chamber 22 through the flame monitoring pipe 4242 is transferred to the flame acquisition device 43 through the sensor hole forming part 463.

An upper end of the flame monitoring pipe 4242 may be located at the same height as the sensor hole forming part 463 in the vertical direction. The upper end of the flame monitoring pipe 4242 may not be located in a lower position than a lower end of the sensor hole forming part 463. This is because if the upper end of the flame monitoring pipe 4242 and the lower end of the sensor hole forming part 463 do not meet or overlap each other, an excessive amount of air may pass through the flame monitoring hole 4241 so that a recirculation flow rate of combustion gas may be reduced and nitrogen oxide may be increased.

Furthermore, the upper part of the flame monitoring pipe 4242, which is inserted into the sensor hole 4630, may be spaced apart inward from an inner surface of the sensor hole forming part 463 so as not to make contact with the inner surface of the sensor hole forming part 463. When both the inner surface of the sensor hole forming part 463 and the flame monitoring pipe 4242 are formed in a cylindrical shape, the inner diameter of the sensor hole forming part 463 may be greater than the outer diameter of the flame monitoring pipe 4242.

Due to the shapes of the above-described components, the amount of heat transferred to the flame acquisition device 43 may be reduced, and thus the flame acquisition device 43 may smoothly operate.

As described above, the oil boiler 1 may include the outer container 21, the combustion chamber 22, the lower cover 29, and the flue tubes 23, the burner 42, and the flame tube part 41 including the recirculation holes 413. Accordingly, the oil boiler 1 may generate a blue flame from fuel of an oil type and may reduce nitrogen oxide.

Further, as described above, the oil boiler 1 may include the combustion chamber 22, the burner 42, the blower 44, the air supply pipe 51 having a total length greater than the length of a straight line connecting the inlet and the outlet straight, and the heat exchanger. Accordingly, the overall height of the oil boiler 1 may be reduced, and the oil boiler 1 may be located within a limited space.

Furthermore, as described above, the oil boiler 1 may include the combustion chamber 22, the burner 42, the blower 44, the air supply pipe 51, the duct 33 including the flue connecting adaptor 333 to which the corrugated pipe 52 and the flue 53 are connected, the heat exchanger, and the case 10. Accordingly, the flue 53 may be installed in various directions. Also, the position where the air supply pipe 51 receives air through the corrugated pipe 52 may be fixed irrespective of the direction in which the flue 53 is installed, and thus the flow rate of air supplied may be stably maintained.

Moreover, as described above, the flame tube part 41 may include the upper flame tube 412 having an upper coupling part and the lower flame tube 411 having a lower coupling part coupled to the upper coupling part. Accordingly, the flame tube part 41 may be assembled in an easy and simple manner and may not be corroded or damaged when heated. Also, heat transfer to the combustion chamber cover 28 by the flame tube part 41 may be reduced.

In addition, as described above, the oil boiler 1 may include the combustion chamber 22, the flame acquisition device 43 installed in the sensor hole 4630, the burner 42 having, in a position space apart from the flame acquisition device 43, the flame monitoring hole 4241 connecting the interior space 220 and the sensor hole 4630, and the heat exchanger. Accordingly, the amount of heat transferred to the flame acquisition device 43 may be reduced, and the flame acquisition device 43 may smoothly operate to enable the state of a flame to be identified.

However, the components of the oil boiler 1 described above may be combined differently from the exemplary combination as needed.

According to the embodiments of the present disclosure, the oil boiler may generate a blue flame while using fuel of an oil type, thereby reducing the amount of nitrogen oxide generated when the oil boiler operates.

Furthermore, the flue may be installed in various directions. In addition, the position where the air supply pipe receives air may be fixed irrespective of the direction in which the flue is installed, and thus the flow rate of air supplied may be stably maintained.

Hereinabove, even though all of the components are coupled into one body or operate in a combined state in the description of the above-mentioned embodiments of the present disclosure, the present disclosure is not limited to these embodiments. That is, all of the components may operate in one or more selective combination within the range of the purpose of the present disclosure. It should be also understood that the terms of "include", "comprise" or "have" in the specification are "open type" expressions just to say that the corresponding components exist and, unless specifically described to the contrary, do not exclude but may include additional components. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An oil boiler comprising:
    an outer container having openings at opposite ends thereof and an empty space therein;
    a combustion chamber configured to cover an opening at an upper end of the outer container, the combustion chamber being located in the empty space of the outer container and having an interior space in which a combustion reaction occurs;
    a lower cover spaced apart downward from the combustion chamber and configured to cover an opening at a lower end of the outer container;
    a plurality of flue tubes provided in the empty space of the outer container to heat heating water flowing in the empty space of the outer container by guiding combustion gas generated by the combustion reaction from the interior space of the combustion chamber to the outside of the lower cover;
    a burner including a fuel nozzle configured to spray fuel of an oil type into the interior space of the combustion chamber, an air nozzle configured to inject air into the interior space, and a spark plug configured to ignite a mixture of the fuel sprayed and the air injected; and
    a flame tube part configured to define a tube space by surrounding, in the interior space, a partial space in which the mixture of the sprayed fuel and the injected air is ignited, the flame tube part including a flame tube having an open lower end and a recirculation hole formed through the flame tube such that the combustion gas in the interior space is introduced into the flame tube from the outside of the flame tube;
    wherein the air nozzle is formed to surround the fuel nozzle and injects the air through an air injection opening formed between an inner side surface of the air nozzle and an outer side surface of the fuel nozzle.

2. The oil boiler of claim 1, further comprising:
    a combustion guide configured to change a progress direction of the combustion gas to an upper direction, the combustion guide including a blocking plate horizontally formed in a plate shape and disposed in the interior space of the combustion chamber so as to be spaced apart from an inner side surface of the combustion chamber, a guide wall extending upward from the blocking plate, the guide wall being formed along a periphery of the blocking plate, and a guide leg extending downward from the blocking plate, the guide leg being configured to support the blocking plate above an inner bottom surface of the combustion chamber.

3. The oil boiler of claim 1, further comprising:
    a buoyant body trap including a storage tank having a space in which water is stored, a buoyant body disposed in the storage tank and floated or sunk by the stored water, and a seating part formed along a periphery of an intermediate drain hole formed through a lower surface of the storage tank, wherein the buoyant body is seated on the seating part to close the intermediate drain hole or is separated from the seating part to open the intermediate drain hole;
    a U-shaped trap located under the buoyant body trap, the U-shaped trap including a first outflow space in which the water drained downward from the buoyant body trap is stored and a second outflow space extending upward from the first outflow space; and a trap device including an outflow container in which the water drained from the second outflow space is stored and from which the water is drained to the outside.

4. The oil boiler of claim 3, further comprising:
a drain valve configured to drain the heating water received in the empty space; and
a safety valve configured to drain the heating water in the empty space to decrease pressure in the empty space,
wherein the drain valve and the safety valve are connected to the outflow container to deliver, to the outflow container, the water drained through an open one of the drain valve and the safety valve.

5. The oil boiler of claim 1, wherein the flue tubes comprise an internal flow passage, wherein a first width and a second width of the internal flow passage are defined on a horizontal plane and perpendicular to each other, and wherein the flue tubes are provided in a flat tube type in which the second width of the internal flow passage through which the combustion gas passes is smaller than the first width of the internal flow passage.

6. The oil boiler of claim 1, further comprising:
a turbulator inserted into each of the flue tubes to turn a flow of the combustion gas passing through the flue tube into a turbulent flow, the turbulator including a plate extending in a vertical direction, a plurality of through-portions formed through the plate, and a plurality of protrusions protruding from the plate,
wherein the turbulator further includes a stopper protruding form an upper end of the plate in a horizontal direction so as to be stopped by an inner bottom surface of the combustion chamber when the turbulator is inserted into the flue tube downward from above the flue tube.

7. The oil boiler of claim 1, further comprising:
a blower;
a blower pipe configured to connect the blower and the burner; and
a damper including a flap provided in the blower pipe so as to be rotatable between a first position for opening the blower pipe and a second position for closing the blower pipe,
wherein the flap is located at the first position by being pressed by an air flow generated by the blower when the blower operates, and the flap is located at the second position by the weight of the flap when the blower does not operate.

8. The oil boiler of claim 1, further comprising:
a blower including an impeller configured to compress the air and deliver the compressed air to the air nozzle and a blower driving motor configured to transfer, to the impeller, a driving force for rotating the impeller; and
a fuel pump device including a fuel pump including gears configured to compress the fuel and deliver the compressed fuel to the fuel nozzle and a fuel pump driving motor provided separately from the blower driving motor and configured to transmit, to the gears, a driving force for rotating the gears.

9. The oil boiler of claim 8, wherein a shaft member of the fuel pump configured to rotate the gears and a driving shaft of the fuel pump driving motor configured to transmit a driving force of the fuel pump driving motor are connected by a coupling that is an Oldham coupling.

10. The oil boiler of claim 9, wherein the fuel pump device further includes a fuel pump case having an interior space in which the shaft member of the fuel pump, the coupling, and the driving shaft of the fuel pump driving motor are received, and a heat dissipation hole formed through the fuel pump case and connected to the interior space, the heat dissipation hole being formed in a size to allow for passage of the coupling and configured to dissipate heat generated during coupling.

11. The oil boiler of claim 10, further comprising:
a flue configured to release the combustion gas to the outside,
wherein the flue is formed of plastic.

12. The oil boiler of claim 8, further comprising:
a processor electrically connected with the fuel pump device,
wherein the processor controls the fuel pump to supply the fuel to the fuel nozzle at a first fuel flow rate that is a predetermined flow rate or at a second fuel flow rate higher than the first fuel flow rate.

13. The oil boiler of claim 12, further comprising:
a temperature acquisition device configured to obtain temperature of the combustion chamber,
wherein the processor is additionally electrically connected with the temperature acquisition device and controls the fuel pump device to supply the fuel to the fuel nozzle at the first fuel flow rate in a case where the temperature of the combustion chamber obtained by the temperature acquisition device exceeds a predetermined upper limit when the fuel pump device supplies the fuel to the fuel nozzle at the second fuel flow rate.

14. The oil boiler of claim 1, further comprising:
a case in which the outer container is received,
wherein the case includes handles provided on two sidewalls facing each other in a horizontal direction among a plurality of walls configured to define the case.

15. The oil boiler of claim 1, wherein the outer container is formed of stainless steel.

* * * * *